(12) United States Patent
Suhail et al.

(10) Patent No.: US 11,575,530 B2
(45) Date of Patent: Feb. 7, 2023

(54) SYSTEMS AND METHODS FOR CALL INITIATION BASED ON MOBILE DEVICE PROXIMITY

(71) Applicant: Slack Technologies, LLC, San Francisco, CA (US)

(72) Inventors: Salman Suhail, San Francisco, CA (US); Robyn Rapp, Sausalito, CA (US)

(73) Assignee: Salesforce, Inc., San Francisco, CA (US)

( * ) Notice: Subject to any disclaimer, the term of this patent is extended or adjusted under 35 U.S.C. 154(b) by 13 days.

(21) Appl. No.: 16/514,947

(22) Filed: Jul. 17, 2019

(65) Prior Publication Data

US 2020/0036543 A1    Jan. 30, 2020

Related U.S. Application Data

(60) Provisional application No. 62/702,986, filed on Jul. 25, 2018.

(51) Int. Cl.
*G06F 15/16* (2006.01)
*H04L 12/18* (2006.01)
*G06F 16/683* (2019.01)
*G06F 16/632* (2019.01)

(52) U.S. Cl.
CPC ........ *H04L 12/1822* (2013.01); *G06F 16/632* (2019.01); *G06F 16/683* (2019.01); *H04L 12/1818* (2013.01); *H04L 12/1827* (2013.01)

(58) Field of Classification Search
CPC . G06F 16/683; G06F 16/632; H04L 12/1822; H04L 12/1818; H04L 12/1827; H04N 7/147; G06Q 10/1093

USPC ........................................................ 709/204
See application file for complete search history.

(56) References Cited

U.S. PATENT DOCUMENTS

| 9,100,355 | B2 | 8/2015 | Tomkow |
| 9,160,550 | B1 | 10/2015 | Morrison et al. |
| 9,491,237 | B1* | 11/2016 | Garg .................. H04L 12/1845 |
| 10,623,403 | B1* | 4/2020 | Gupta ................. H04M 3/5166 |
| 2014/0340468 | A1* | 11/2014 | Winterstein ........... H04N 7/147 |
| | | | 348/14.08 |

(Continued)

OTHER PUBLICATIONS

D. Luo, M. Sun and J. Huang, "Audio Postprocessing Detection Based on Amplitude Cooccurrence Vector Feature," in IEEE Signal Processing Letters, vol. 23, No. 5, pp. 688-692, May 2016 (Year: 2016).*

(Continued)

*Primary Examiner* — Oscar A Louie
*Assistant Examiner* — Messeret F Gebre
(74) *Attorney, Agent, or Firm* — Holland & Hart LLP

(57) ABSTRACT

Certain embodiments are directed to systems and methods for facilitating the process of joining a conference call within a conference environment. A conference call participant may initiate a conference call within a conference environment (e.g., a conference room), by causing the participant's client device to emit a unique audio tone (which may be human-audible or human-inaudible) that is detected by a call device within the conference room. The unique tone is indicative of unique conference call identification data, which may be utilized by the call device to initiate the conference call, without requiring additional user input by the conference call participant.

21 Claims, 7 Drawing Sheets

(56) References Cited

U.S. PATENT DOCUMENTS

| | | | |
|---|---|---|---|
| 2015/0264314 A1* | 9/2015 | Goesnar | H04L 12/1818 348/14.08 |
| 2017/0353442 A1* | 12/2017 | Burch | H04L 63/08 |
| 2018/0197144 A1 | 7/2018 | Frank et al. | |
| 2018/0212903 A1 | 7/2018 | Rose et al. | |
| 2018/0287982 A1 | 10/2018 | Draeger et al. | |

OTHER PUBLICATIONS

Still, J. D., Cain, A., & Schuster, D. (2017). Human-centered authentication guidelines. Information and Computer Security, 25(4), 437-53. (Year: 2017).*

I. M. Maung, Y. Tew and K. Wong, "Authentication for AAC compressed audio using data hiding," 2016 IEEE International Conference on Consumer Electronics—Taiwan (ICCE—TW), 2016, pp. 1-2 (Year: 2016).*

S. Gupta, S. Cho and C. . -C. J. Kuo, "Current Developments and Future Trends in Audio Authentication," in IEEE MultiMedia, vol. 19, No. 1, pp. 50-59, Jan. 2012 (Year: 2012).*

"Die, Email, Die! A Flickr Cofounder Aims To Cut Us All Some Slack", READWRITEWEB, LEXISNEXIS, https://advance.lexis.com/api/permalink/33dd79e2-90f5-409d-ae27-5a2c7e86bf31/?context=1000516>. (dated Aug. 14, 2013, 4:15 PM) 2 pages.

"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 13 pages.

Adrienne LaFrance, "The Triumph of Email", Atlantic Online, LEXISNEXIS, https://advance.lexis.com/api/permalink/32d7ddd9-d4c1-4a73-86f7-08ab5842fde6/?context=1000516, (dated Jan. 6, 2016) 5 pages.

David Auberbach, "Re-Animator. How Stewart Butterfield created Flickr and Slack out of the ashes of failed projects" [online][retrieved May 9, 2019]. Retrieved from the Internet: <URL: https://slate.com/business/2014/05/stewart-butterfield-flickr-and-slack-how-he-snatched-victory-from-the-jaws-of-defeat.html>. (dated May 28, 2014, 2:48 PM) 8 pages.

Ernie Smith, "Picking Up The Slack", TEDIUM, [online][retrieved May 9, 2019]. Retrieved from the Internet: <URL: https://tedium.co/2017/10/17/irc-vs-slack-chat-history/>. (dated Oct. 17, 2017) 8 pages.

Internet Relay Chat, WIKIPEDIA, [online][retrieved May 30, 2019]. Retrieved from the Internet: <URL: https://en.wikipedia.org/wiki/Internet_Relay_Chat>. (dated May 28, 2019) 17 pages.

Jonathan Vanian, "Why these startups think chat apps are the next big thing in workplace collaboration", GIGAOM, LEXISNEXIS, https://advance.lexis.com/api/permalink/e83778c8-09c8-43aa-9ba0-88526283de69/?context=1000516, (dated Aug. 1, 2014, 5:45 PM) 4 pages.

Matsumoto, T. et al., "Chocoa Communicator—A New Communication System Based on Awareness and Text Communications—", FUJITSU Sci. Tech. J., 36, 2, (Dec. 2000) 154-161.

Matthew Ingram, "Flickr co-founder launches Slack, an all-in-one messaging tool designed to kill email forever", GIGAOM, LEXISNEXIS, https://advance.lexis.com/api/permalink/0b676b7c-aec3-4560-861e-d030d1dd008c/?context=1000516, (dated Feb. 12, 2014, 7:03 PM), 2 pages.

Michael Carney, "Slack is thriving on a cocktail of whimsy and great timing", PANDODAILY, LEXISNEXIS, https://advance.lexis.com/api/permalink/dd2d4ee5-2ddf-4d3a-a1d9-3bcee5e38b74/?context=1000516, (dated Feb. 6, 2015, 2:12 AM) 3 pages.

Mike Issac, "Slack, a Start-Up With an App to Foster Business Collaboration, Is Valued at $1.1 Billion", The New York Times Blogs (BITS), LEXISNEXIS, https://advance.lexis.com/api/permalink/3eb84b34-a8f9-4d7d-9573-89d9598a4963/?context=10000516>. (dated Oct. 31, 2014) 2 pages.

Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 66 pages.

Rebecca Walberg, "Email biggest office waste of time: survey", National Post, At FP10, LEXISNEXIS, https://advance.lexis.com/api/permalink/96268e3f-26ad-48ac-a98f-6c39804ebded/?context=1000516, (dated Mar. 4, 2014) 2 pages.

Robert Hof, "Stewart Butterfield On How Slack Became A $2.8 Billion Unicorn", FORBES, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 3 pages.

The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 27 pages.

* cited by examiner

SYSTEMS AND METHODS FOR CALL INITIATION BASED ON MOBILE DEVICE PROXIMITY

CROSS-REFERENCE TO RELATED APPLICATIONS

This patent application claims priority from U.S. Provisional Application Ser. No. 62/702,986, filed Jul. 25, 2018, which is incorporated herein by reference in its entirety.

BACKGROUND

Various systems and devices have historically enabled users to schedule and hold calls (e.g., audio-only calls or video and audio calls) across separate electronic devices. However, existing systems and devices have provided limited functionality for users.

Through applied effort, ingenuity, and innovation many deficiencies of such systems have been solved by developing solutions that are in accordance with the embodiments of the present invention, many examples of which are described in detail herein.

BRIEF SUMMARY

Various embodiments are directed to systems and methods for providing enhanced functionality for call users by enabling users to initiate/join a call (e.g., a video conference call) on a call system (e.g., a video conferencing system) from a separate electronic mobile device (e.g., a client device) without a preexisting handshake connection between the call system and the separate electronic mobile device. The electronic mobile device stores and/or accesses meeting identifier data for the scheduled call, and transmits an audio signal (e.g., a high-frequency audio signal that is outside of the human hearing range) indicative of the meeting identifier data to the call system while the call system is in a listening mode, which decodes the meeting identifier data within the audio signal, and initiates/joins the call.

Certain embodiments are directed to a system configured for activating a connection to a call, wherein the system comprises: one or more non-transitory memory storage repositories; and one or more processors. In certain embodiments, the one or more processors are collectively configured to: receive audio signature data from a call device, wherein the audio signature data is received by a microphone of the call device; determine a meeting identifier based at least in part on the audio signature data, wherein the meeting identifier is associated with a call; and establish a call connection for the call between the call device and an external call platform based at least in part on the determined meeting identifier.

In various embodiments, determining a meeting identifier comprises: receiving an audio data file comprising the audio signature data from the call device; extracting the audio signature data from the audio data file; and determining a meeting identifier based at least in part on the audio signature data extracted from the audio data file. Moreover, determining a meeting identifier may comprise: querying a lookup table stored within the one or more non-transitory memory storage repositories based at least in part on the audio signature data, wherein the lookup table maps audio signature data with meeting identifiers; and receiving a meeting identifier mapped to the audio signature data. In certain embodiments, the audio signature data comprises header data and meeting identifier data, and wherein determining a meeting identifier comprises: determining, based at least in part on the header data of the audio signature data, an external call platform for the call; and determining, based at least in part on the meeting identifier data, a meeting identifier usable to initialize the call with the external call platform. Moreover, establishing a call connection for the call according to certain embodiments comprises initializing a real-time call connection via a network between the call device and the external call platform. In various embodiments, initializing a real-time call connection comprises initializing a real-time video call connection via the network between the call device and the external call platform. Moreover, in certain embodiments, the one or more processors are further configured to: receive a call generation request; determine the meeting identifier data for the call generation request; generate the audio signature data based at least in part on the meeting identifier; and transmit the audio signature data to one or more client devices, wherein the audio signature data causes the one or more client devices to emit an audio signal upon activation of the audio signature data. In certain embodiments, the audio signature data comprises user identifier data, and wherein the one or more processors are further configured to identify a user identifier as a participant in a call based at least in part on receipt of the user identifier data as a part of an audio signature.

Various embodiments are directed to a computer-implemented method for activating a connection to a call. In certain embodiments, the method comprises: receiving audio signature data from a call device, wherein the audio signature data is received by a microphone of the call device; determining a meeting identifier based at least in part on the audio signature data, wherein the meeting identifier is associated with a call; and establishing a call connection for the call between the call device and an external call system based at least in part on the determined meeting identifier.

In various embodiments, determining a meeting identifier comprises: receiving an audio data file comprising the audio signature data from the call device; extracting the audio signature data from the audio data file; and determining a meeting identifier based at least in part on the audio signature data extracted from the audio data file.

In certain embodiments, determining a meeting identifier comprises: querying a lookup table stored within the one or more non-transitory memory storage repositories based at least in part on the audio signature data, wherein the lookup table maps audio signature data with meeting identifiers; and receiving a meeting identifier mapped to the audio signature data. In various embodiments, the audio signature data comprises header data and meeting identifier data, and wherein determining a meeting identifier comprises: determining, based at least in part on the header data of the audio signature data, an external call platform for the call; and determining, based at least in part on the meeting identifier data, a meeting identifier usable to initialize the call with the external call platform. In certain embodiments, establishing a call connection for the call comprises initializing a real-time call connection via a network between the call device and the external call platform. Moreover, in various embodiments, initializing a real-time call connection comprises initializing a real-time video call connection via the network. In certain embodiments, the method further comprises: receive a call generation request; determine the meeting identifier data for the call generation request; generate the audio signature data based at least in part on the meeting identifier; and transmit the audio signature data to one or more client devices, wherein the audio signature data causes the one or more client devices to emit an audio signal upon activation of the audio signature data. In various embodiments, the audio signature data comprises user identifier data, and wherein method further comprises identifying a user identifier as a participant in a call based at least in part on receipt of the user identifier data as a part of an audio signature.

Various embodiments are directed to a computer program product for activating a connection to a call, the computer program product comprising at least one non-transitory computer-readable storage medium having computer-readable program code portions stored therein, the computer-readable program code portions comprising an executable portion configured to: receive audio signature data from a call device, wherein the audio signature data is received by a microphone of the call device; determine a meeting identifier based at least in part on the audio signature data, wherein the meeting identifier is associated with a call; and establish a call connection for the call between the call device and an external call platform based at least in part on the determined meeting identifier.

In certain embodiments, determining a meeting identifier comprises: receiving an audio data file comprising the audio signature data from the call device; extracting the audio signature data from the audio data file; and determining a meeting identifier based at least in part on the audio signature data extracted from the audio data file. In various embodiments, determining a meeting identifier comprises: querying a lookup table stored within the one or more non-transitory memory storage repositories based at least in part on the audio signature data, wherein the lookup table maps audio signature data with meeting identifiers; and receiving a meeting identifier mapped to the audio signature data.

Moreover, the audio signature data of certain embodiments comprises header data and meeting identifier data, and wherein determining a meeting identifier comprises: determining, based at least in part on the header data of the audio signature data, an external call platform for the call; and determining, based at least in part on the meeting identifier data, a meeting identifier usable to initialize the call with the external call platform. In certain embodiments, establishing a call connection for the call comprises initializing a real-time call connection via a network between the call device and the external call platform. In various embodiments, initializing a real-time call connection comprises initializing a real-time video call connection via the network. In certain embodiments, the computer program product further comprises an executable portion configured to: receive a call generation request; determine the meeting identifier data for the call generation request; generate the audio signature data based at least in part on the meeting identifier; and transmit the audio signature data to one or more client devices, wherein the audio signature data causes the one or more client devices to emit an audio signal upon activation of the audio signature data. In certain embodiments, the audio signature data comprises user identifier data, and further comprising an executable portion configured to identify a user identifier as a participant in a call based at least in part on receipt of the user identifier data as a part of an audio signature.

Various embodiments are directed to a system configured for activating a connection to a call. In certain embodiments the system comprises: one or more non-transitory memory storage repositories; one or more microphones; and one or more processors, wherein the one or more processors are collectively configured to: receive, via a microphone of the one or more microphones, an audio signature, wherein the audio signature is indicative of a meeting identifier for a call; transmit data indicative of the meeting identifier to a call platform; and based at least in part on the audio signature, establish a call connection for the call with the call platform.

In various embodiments, the one or more processors are further configured to determine the meeting identifier for the call based at least in part on the audio signature. Moreover, determining the meeting identifier for the call based at least in part on the audio signature may comprise: generating audio signature data based at least in part on the audio signature received via the microphone of the one or more microphones; and translating the audio signature data into the meeting identifier.

In certain embodiments, the one or more computer processors are further configured to: transmit the audio signature to the call platform, wherein the call platform is configured to determine the meeting identifier for the call based at least in part on the audio signature. In various embodiments, the audio signature comprises a supersonic series of tones. Moreover, in certain embodiments, the audio signature comprises a header portion, and wherein the one or more processors are further configured to select a call connection platform for establishing the call connection based at least in part on the header portion of the audio signature. In certain embodiments, the audio signature comprises user identifier data, and wherein the one or more processors are further configured to identify a user identifier as a participant in a call based at least in part on receipt of the user identifier data as a part of an audio signature.

Certain embodiments are directed to a computer program product for activating a connection to a call, the computer program product comprising at least one non-transitory computer-readable storage medium having computer-readable program code portions stored therein, the computer-readable program code portions comprising an executable portion configured to: receive, via a microphone, an audio signature, wherein the audio signature is indicative of a meeting identifier for a call; transmit data indicative of the meeting identifier to a call platform; and based at least in part on the audio signature, establish a call connection for the call with the call platform.

In various embodiments, the computer program product further comprises an executable portion configured to determine the meeting identifier for the call based at least in part on the audio signature. In certain embodiments, determining the meeting identifier for the call based at least in part on the audio signature comprises: generating audio signature data based at least in part on the audio signature received via the microphone of the one or more microphones; and translating the audio signature data into the meeting identifier.

In various embodiments, the computer program product further comprises an executable portion configured to: transmit the audio signature to the call platform, wherein the call platform is configured to determine the meeting identifier for the call based at least in part on the audio signature. In certain embodiments, the audio signature comprises a supersonic series of tones. Moreover, in certain embodiments, the audio signature comprises a header portion, and further comprising an executable portion configured to select a call connection platform for establishing the call connection based at least in part on the header portion of the audio signature. In various embodiments, the audio signature comprises user identifier data, and further comprising an executable portion configured to identify a user identifier as a participant in a call based at least in part on receipt of the user identifier data as a part of an audio signature.

Certain embodiments are directed to a computer-implemented method for activating a connection to a call, the computer-implemented method comprising: receiving, via a microphone, an audio signature, wherein the audio signature is indicative of a meeting identifier for a call; transmitting data indicative of the meeting identifier to a call platform; and based at least in part on the audio signature, establishing a call connection for the call with the call platform.

In various embodiments, the method further comprises determining the meeting identifier for the call based at least in part on the audio signature. In various embodiments, determining the meeting identifier for the call based at least in part on the audio signature comprises: generating audio signature data based at least in part on the audio signature received via the microphone of the one or more microphones; and translating the audio signature data into the meeting identifier.

According to certain embodiments, the method further comprises transmitting the audio signature to a call platform, wherein the call platform is configured to determine the meeting identifier for the call based at least in part on the audio signature. In certain embodiments, the audio signature comprises a supersonic series of tones. Moreover, the audio signature may comprise a header portion, and wherein the method further comprises selecting a call connection platform for establishing the call connection based at least in part on the header portion of the audio signature. According to certain embodiments, the audio signature comprises user identifier data, and wherein the method further comprises identifying a user identifier as a participant in a call based at least in part on receipt of the user identifier data as a part of an audio signature.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Glossary

Figure 1:
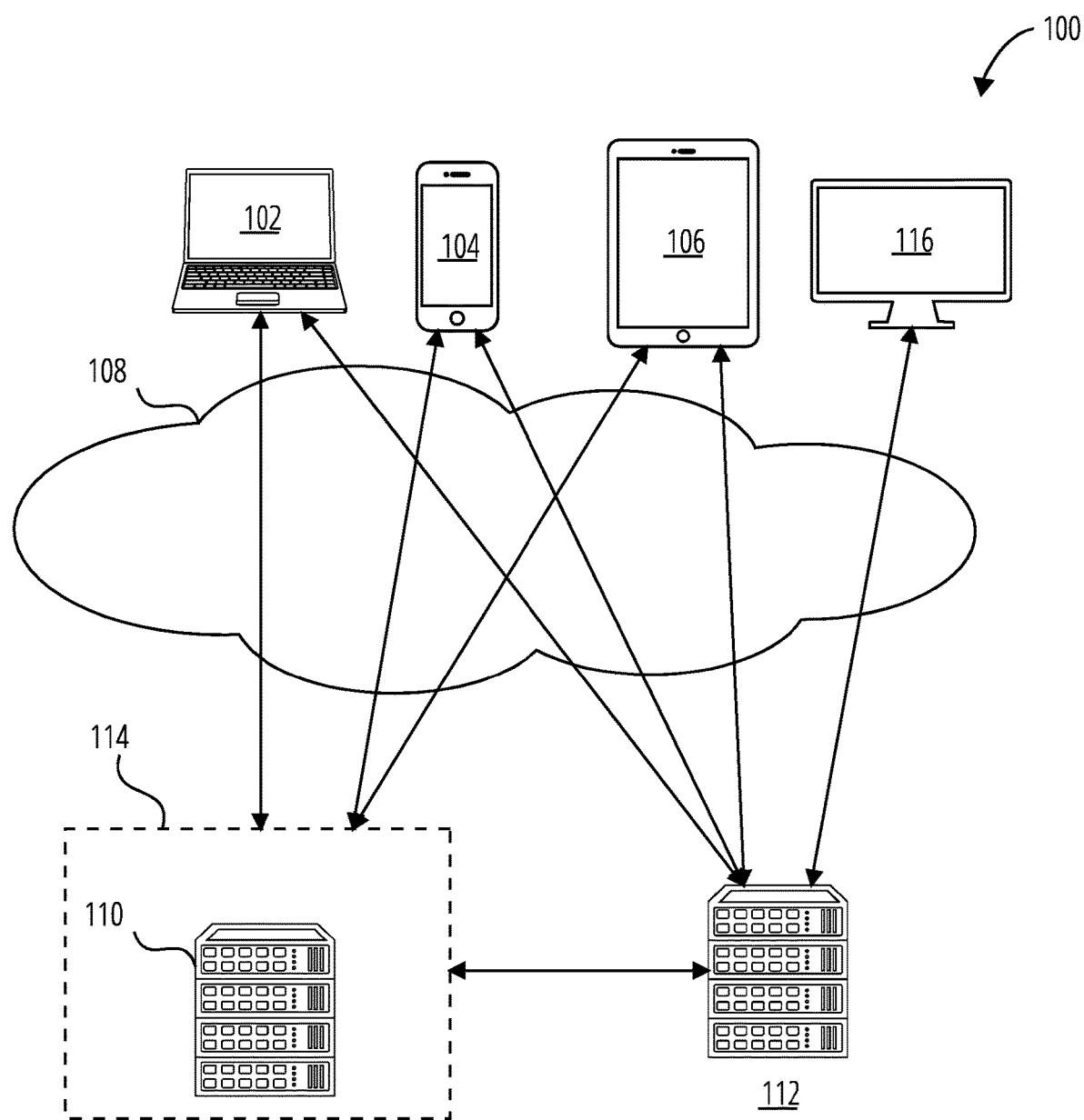
FIG. 1 illustrates a schematic view of a system 100 encompassing a group-based communication platform and one or more external call systems in communication with one or more client devices in accordance with one embodiment.

"Client device" in this context refers to computer hardware(s) and/or software(s) that is/are configured to access one or more services made available by one or more servers. The server(s) is/are often (but not always) on another computer system, in which case the client device accesses the service by way of a network. A client device may be associated with a group identification, where the group identification is an electronic indication that suggests a group (e.g., user group) that the user belongs to. Client devices may include, without limitation, smart phones, tablet computers, laptop computers, desktop computers, wearable devices, personal computers, enterprise computers, and the like.

"Sending user identifier" in this context refers to a collection of messages that are sent by a particular user (i.e., a client device associated with the particular user). These messages may be analyzed to determine context regarding the user (e.g., the user's expertise or interest in a topic may be determined based on the frequency of mention of the topic or key words associated with the topic within such messages).

"Message" in this context refers to any electronically generated digital content object provided by a user using a client device and that is configured for display within a group-based communication channel interface. Messages may also be referred to as "messaging communications" in certain embodiments. Messages may include or be embodied as any text, image, video, audio, files, interactive links, or combination thereof provided by a user (using a client device). For instance, the user may provide a messaging communication that includes text as well as an image and a video within the messaging communication as message contents. In such a case, the text, image, and video would comprise the messaging communication or digital content object. Each message sent or posted to a group-based communication channel of the group-based communication system includes metadata comprising the following: a sending user identifier, a message identifier, message contents, a group identifier, and a group-based communication channel identifier. Each of the foregoing identifiers may comprise ASCII text, a pointer, a memory address, and the like.

"Message distribution servers" in this context refers to computing devices configured for interacting with various client devices for receiving and/or disseminating messages for distribution within communication channels and/or for providing appropriate connectivity between client devices to enable calls therebetween. Message distribution servers may be configured to receive, store (in an associated database), and/or direct messages exchanged between users (operating via client devices). The functionality of the message distribution servers may be provided via a single server or collection of servers having a common functionality, or the functionality of the message distribution servers may be segmented among a plurality of servers or collections of servers performing subsets of the described functionality of the message distribution servers. For example, a first subset of message distribution servers may be configured for receiving messages from client devices and/or for transmitting messages to client devices (e.g., via one or more interface servers). These message distribution servers may be in communication with a second subset of message distribution servers configured for collecting messages distributed within communication channels and for storing those messages within a message repository database for indexing and archiving.

"Group-based communication platform" in this context refers to a collection of computing services that are accessible to one or more client devices, and that are operable to provide access to a plurality of software applications related to operations of databases. In some examples, the group-based communication platform may take the form of one or more central servers disposed in communication with one or more additional servers running software applications, and having access to one or more databases storing digital content items, application-related data, and/or the like. The group-based communication platform may also support client retention settings and other compliance aspects. Further, the group-based communication platform may provide comprehensive third party developer support that grants appropriate access to the data and allows third parties to build applications and bots to integrate with customer's workflows. Group-based communication platform users are organized into organization groups (e.g., employees of each company may be a separate organization group) and each organization group may have one or more communication channels (e.g., group-based communication channels) to which users may be assigned or which the users may join (e.g., group-based communication channels may represent departments, geographic locations such as offices, product lines, user interests, topics, issues, and/or the like). A group identifier may be used to facilitate access control for a message (e.g., access to the message, such as having the message return as part of search results in response to a search query, may be restricted to those users having the group identifier associated with their user profile). The group identifier may be used to determine context for the message (e.g., a description of the group, such as the name of an organization and/or a brief description of the organization, may be associated with the group identifier). Group-based communication system users may join and/or create communication channels (e.g., group-based communication channels). Some group-based communication channels may be globally accessible to those users having a particular organizational group identifier associated with their user profile (i.e., users who are members of the organization). Access to some group-based communication channels may be restricted to members of specified groups, whereby the group-based communication channels are accessible to those users having a particular group identifier associated with their user profile. The group-based communication channel identifier may be used to facilitate access control for a message (e.g., access to the message, such as having the message return as part of search results in response to a search query, may be restricted to those users having the group-based communication channel identifier associated with their user profile, or who have the ability to join the group-based communication channel). The group-based communication channel identifier may be used to determine context for the message (e.g., a description of the group-based communication channel, such as a description of a project discussed in the group-based communication channel, may be associated with the group-based communication channel identifier).

A "user profile" in this context refers to information associated with a user, including, for example, a user identifier, one or more communication channel identifiers (e.g., group-based communication channel identifiers) associated with communication channels (e.g., group-based communication channels) that the user has been granted access to, one or more group identifiers for groups with which the user is associated, an indication as to whether the user is an owner of any group-based communication channels, an indication as to whether the user has any group-based communication channel restrictions, a plurality of messages, a plurality of emojis, a plurality of conversations, a plurality of conversation topics, an avatar, an email address, a real name (e.g., John Doe), a username (e.g., j doe), a password, a time zone, a status, and the like. The term user profile may be used interchangably with "user account, and user account details." The user account details can include a subset designation of user credentials, such as, for example, login information for the user including the user's username and password.

"Channel identifier" in this context refers to one or more items of data by which a group-based communication channel may be identified. Channel identifiers may also be referred to as "group-based communication channel identifiers" in certain embodiments. For example, a group-based communication channel identifier may comprise ASCII text, a pointer, a memory address, and the like.

"Group-based communication channel interface" in this context refers to a virtual communications environment or feed that is configured to display messaging communications posted by channel members (e.g., validated users accessing the environment using client devices) that are viewable only to the members of the group. The format of the group-based communication channel interface may appear differently to different members of the group-based communication channel; however, the content of the group-based communication channel interface (i.e., messaging communications) will be displayed to each member of the group-based communication channel. For instance, a common set of group-based messaging communications will be displayed to each member of the respective group-based communication channel such that the content of the group-based communication channel interface (i.e., messaging communications) will not vary per member of the group-based communication channel.

"Call" in this context refers to real-time audio and/or video-based communications between a plurality of client devices. Calls may be executed by connecting at least two client devices for real-time data transfer therebetween, by sharing video and/or audio collected via one of the client devices via a user interface of the other client device(s) connected within the call. In certain embodiments, calls may be accompanied by messaging interfaces enabling text-based messages or other data to be transferred between client devices during the call.

"Communication channel" in this context refers to an information route and associated circuitry that is used for data exchange between and among systems and parts of systems. For example, a communication channel may be established between and among various client devices, allowing these client devices to communicate and share data between and among each other. These communication channels may be "group-based communication channels" established between and among a select group of client devices (and their respective users) for sharing messages among all users of the group. The communication channels may also and/or alternatively be one-to-one, direct message communication channels established between and among two client devices (and their respective users) for sharing messages among only those two users. Multiple communication channels may operate on each of one or more computing devices, and therefore a communication channel identifier may be assigned to a communication channel, which indicates the physical address in a database where related data of that communication channel is stored and which is utilized to identify client devices that participate within the communication channel to receive data exchanged on the communication channel. The communication channel identifier therefore ensures communication channels remain distinct and separate even on computing devices associated with a plurality of communication channels. A communication channel may be "public," which may allow any client device to join and participate in the information sharing through the communication channel. A communication channel may be "private," which may restrict data communications in the communication channel to certain client devices and/or users.

"External call system" in this context refers to a system operating via one or more servers which are in network communication with a group-based communication platform, and which service, manage, and/or perform actions that enable real-time calls (e.g., audio-only calls, video-calls, and/or the like) between a plurality of user computing entities. The external call systems may comprise additional storage repositories (e.g., databases) storing data enabling various call functionalities that may be performed via the external call system.

"Data" in this context refers to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like. Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

"Group identifier" in this context refers to one or more items of data by which a group within a group-based communication system may be identified. Group identifiers may also be referred to as "team identifiers" in certain embodiments. For example, a group identifier or team identifier may comprise ASCII text, a pointer, a memory address, and the like.

A "user" in this context refers to an individual, a group of individuals, business, organization, and the like. Users may access a group-based communication or messaging system using client devices. "Group-based" is used herein to refer to a system, channel, message, or virtual environment that has security sufficient such that it is accessible only to a defined group of users. The group may be defined by common access credentials such as those of an organization or commercial enterprise. Access may further be facilitated by a validated request to join or an invitation to join transmitted by one group member user to another non-member user. Group identifiers (defined below) are used to associate data, information, messages, etc., with specific groups.

"Private group-based communication channel" in this context refers to a group-based communication channel with restricted access such that it is not generally accessible and/or searchable by other members of the group-based communication system. For example, only those users or administrators who have knowledge of and permission to access (e.g., a group-based communication channel identifier for the private group-based communication channel is associated with their user profile after the user has been validated/authenticated) the private group-based communication channel may view content of the private group-based communication channel.

"Participant" in this context refers to users invited to (e.g., via an electronic calendar invite) and/or who join a call. Participants may be identified based on user identifying data, such as user profile data, user names, and/or the like. Participants may also be identified as being either an active participant that has actually joined a call, or an inactive participant that is invited to join a call but who does not actually join the call. Moreover, participants of recurring calls in particular may be identified as being either required participants—which are users that must be present on a call for it to occur, or optional participants—which are users which are invited to a call but which do not have to be present on the call for the call to occur. In other words, calls may be scheduled such that the schedules of required participants enable those participants to join the call, and optional participants may be invited to a call, even if the call overlaps with a scheduling conflict that prevents the optional participant from joining the call.

Description

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

Overview

Various embodiments drastically simplify the process of joining a meeting (e.g., a video call, a conference call, and/or the like) within a conference environment, such as a conference room. Conference call users have historically struggled to keep conference dial-in, conference meeting numbers, and/or other unique conference call identification data handy when reaching a conference room, as many existing conferencing systems require users to input one or more numbers to join a meeting. In some cases, users are required to enter a first identifier to call into the general conference service (e.g., a phone number), then the users are required to enter a unique meeting identifier (e.g., to specifically reach the conference call), and in some cases, users are then required to enter additional unique identifiers, such as a security PIN to join the conference call, and/or a unique attendee number so that the user's attendance may be recorded.

Because video call devices and/or other call devices, such as conference phones, video conference equipment, and/or the like must generally remain easily accessible to any and all potential conference call users, call devices may be incapable of automatically retrieving calendar and/or conference call information for any and all prospective users of the call device so as to automatically retrieve relevant unique call data to initiate calls for users. Alternatively, existing connection methodologies (either wired or wireless) between devices requires a substantial amount of set-up so as to enable data transfer therebetween, for example, to enable users to transfer unique call data from a user's client device to the call device.

Accordingly, various embodiments have overcome these technological challenges associated with seamlessly providing unique call information from a user (e.g., a user's client device) to a call device so as to initiate a conference call via the call device.

As discussed herein, certain embodiments are directed to systems and methods that facilitate the process of initiating/joining a conference call (e.g., a video conference call) in a conference room or other dedicated conference environment. A client device in a user's possession (e.g., the user's mobile phone) stores and/or has access to the user's calendar, for example, via an app associated with a group-based communication platform. The calendar data for the user may include one or more scheduled calls, and the associated calendar objects include a meeting identifier and/or an identification of a call platform to be utilized for the call, and which enables access to the call via the associated call platform. Moreover, the meeting identifier (also referred to herein as a meeting ID) may be provided in machine-readable and/or human readable alphanumeric text, and the meeting identifier may have an associated unique audio signal (e.g., human-audible signal and/or high-frequency, human-inaudible signal) that may be stored locally on the client device and/or may be accessible to stream from the group-based communication platform and/or an external call system. Once the user is within a conference room (or other dedicated conference environment), the client device plays the audio signal (e.g., in response to a trigger event, such as receipt of user input requesting the audio signal is played, receipt and identification of an audio signal emitted from a video call device that is indicative of the identity of the video call device, the type of external call system associated with the video call device, and/or the like). The audio signal is detected by a video call device within the conference room and decoded (e.g., locally at the video call device and/or remotely at an external call system) to enable the video call device to identify the meeting identifier associated therewith. The video call device then joins/initiates the video call for the user via the video call device (and associated conference display and/or conference camera), without requiring user input providing the meeting identifier directly to a user interface of the video call device.

As yet another example, a video call device within a conference room (or other dedicated conference environment) may be configured to emit a specific audio signal (e.g., a high-frequency audio signal outside of the human-detectable range) that identifies the video call device, identifies an external call system associated with the video call device, identifies a meeting ID associated with a scheduled call, and/or the like. The video call device may be configured to constantly emit the specific audio signal (e.g., repeating the specific audio signal) and/or the video call device may be configured to emit the specific audio signal upon the occurrence of specific trigger events (e.g., within a specific time period before a scheduled start of a call, upon detection of a client device entering within a detectable range of the video call device, and/or the like). A client device, operating an app associated with a group-based communication platform, for example, may detect the audio signal emitted by the video call device, and the app associated with the group-based communication platform deciphers the detected audio signal to determine an external call system associated with the video call device, and retrieves and/or generates an appropriate responsive audio signal for the client device to emit. The client device thereafter emits the retrieved/generated responsive audio signal for detection by the video call device, which detects the responsive audio signal, deciphers the responsive audio signal, and initializes/joins a call based at least in part on the responsive audio signal.

Example System Architecture

Methods, apparatuses, and computer program products of the present invention may be embodied by any of a variety of devices. For example, the method, apparatus, and computer program product of an example embodiment may be embodied by a network device, such as a server or other network entity, configured to communicate with one or more devices, such as one or more client devices. In some preferred and non-limiting embodiments, the computing device may include fixed computing devices, such as a personal computer or a computer workstation. Still further, example embodiments may be embodied by any of a variety of mobile devices, such as a portable digital assistant (PDA), mobile phone, smartphone, laptop computer, tablet computer, wearable device, or any combination of the aforementioned devices.

FIG. 1 illustrates an example computing system 100 within which embodiments of the present invention may operate. Users may access a group-based communication platform 114 and/or external call system 112 via a communication network 108 using client devices 102-106 and/or video call device 116 (which may be located within a dedicated conference room or other conference environment).

In certain embodiments, a communication network 108 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, communication network 108 may include a cellular telephone, an 802.11, 802.16, 802.20, and/or WiMax network. Further, the communication network 108 may include a public network, such as the Internet, a private network, such as an intranet, or combinations thereof, and may utilize a variety of networking protocols now available or later developed including, but not limited to TCP/IP based networking protocols. For instance, the networking protocol may be customized to suit the needs of the group-based communication system. In some embodiments, the protocol is a custom protocol of JSON objects sent via a websocket channel. In some embodiments, data may be transmitted via a plurality of protocols, such as JSON over RPC, JSON over REST/HTTP, and the like.

In the illustrated embodiment, the group-based communication platform 114 includes an at least one message distribution server(s) 110 accessible via the communication network 108. Collectively, the at least one message distribution server(s) 110 is configured for receiving messages transmitted from one or more client devices 102-106, storing the messages within database storage areas for individual communication channels, transmitting messages to appropriate client devices 102-106, facilitating call connections to enable real-time data sharing between client devices 102-106, providing links to external call systems 112 to initiate call connections between client devices 102-106 and/or one or more video call device 116.

The client devices 102-106 may be any computing device as defined above. Electronic message data and/or call data exchanged between the message distribution server(s) 110, the client device 102-106, and/or one or more video call device 116 may be provided in various forms and via various methods.

In some preferred and non-limiting embodiments, one or more of the client devices 102-106 are mobile devices, such as smartphones or tablets. The one or more client devices may execute an "app" to interact with the message distribution server(s) 110 and/or one or more external call system 112. In certain embodiments, the external call system 112 may be accessible to client devices 102-106 as a functionality of the app, however in other embodiments the external call system 112 may be accessible to client devices 102-106 via separate apps executable by the client devices 102-106. In the latter instance, the app associated with the group-based communication platform 114 may be configured to cause the client device 102-106 to initialize an app associated with the external call system 112 upon the initiation of a call utilizing the external call system 112. Such apps are typically designed to execute on mobile devices, such as smartphones or tablets. For example, an app may be provided that executes on mobile device operating systems such as Apple Inc.'s iOS®, Google Inc.'s Android®, or Microsoft Inc.'s Windows 10 Mobile®. These platforms typically provide frameworks that allow apps to communicate with one another, and with particular hardware and software components of mobile devices. For example, the mobile operating systems named above each provides frameworks for interacting with location services circuitry, wired and wireless network interfaces, user contacts, and other applications. Communication with hardware and software modules executing outside of the app and/or between apps is typically provided via application programming interfaces (APIs) provided by the mobile device operating system. Thus, via the app executing on the client devices 102-106, these client devices 102-106 are configured for communicating with the group-based communication platform 114.

The video call device 116 may have a configuration similar to that of the client devices 102-106. The video call device 116 may be embodied as a mobile computing device (e.g., a tablet, a laptop, and/or the like) or an immobile computing device (e.g., a desktop computer, a dedicated video conferencing computing device, and/or the like) in communication with one or more video conferencing components, such as a separate conference display 408 and/or conference camera 410. Similar to the client devices 102-106, the video call device 116 may be configured to execute an "app" to interact with the external call system 112 and/or the message distribution server(s) 110 to enable video conferencing via the video conferencing platform of the external call system 112. Thus, the video call device 116 may be configured to enable video calling with other electronic devices (e.g., client devices 102-106, another video call device 116, and/or the like) having access to the video call platform of the external call system 112, for example, via respectively installed apps operating on those other electronic devices.

In some preferred and non-limiting embodiments, the client devices 102-106 (or video call device 116) may interact with the message distribution server(s) 110 via a web browser. The client devices 102-106 may also include various hardware or firmware designed to interact with the message distribution server(s) 110 and/or external call systems 112. Again, via the browser of the client devices 102-106, the client devices 102-106 are configured for communicating with the group-based communication platform 114 and/or one or more external call systems 112.

In some embodiments of an exemplary group-based communication platform 114, a message or messaging communication may be sent from a client device 102-106 to a group-based communication platform 114. In various implementations, messages may be sent to the group-based communication platform 114 over communication network 108 directly by one of the client devices 102-106. The messages may be sent to the group-based communication platform 114 via an intermediary such as a message server, and/or the like. For example, a client device 102-106 may be a desktop, a laptop, a tablet, a smartphone, and/or the like that is executing a client application (e.g., a group-based communication app). In one implementation, the message may include data such as a message identifier, sending user identifier, a group identifier, a group-based communication channel identifier, message contents (e.g., text, emojis, images, links), attachments (e.g., file objects), message hierarchy data (e.g., the message may be a reply to another message), third party metadata, and/or the like. In one embodiment, the client device 102-106 may provide the following example message, substantially in the form of a (Secure) Hypertext Transfer Protocol ("HTTP(S)") POST message including eXtensible Markup Language ("XML") formatted data, as provided below:

```
POST /authrequest.php HTTP/1.1
Host: www.server.com
Content-Type: Application/XML
Content-Length: 667
<?XML version = "1.0" encoding = "UTF-8"?>
<auth_request>
    <timestamp>2020-12-31 23:59:59</timestamp>
    <user_accounts_details>
        <user_account_credentials>
            <user_name>ID_user_1</user_name>
            <password>abc123</password>
            //OPTIONAL<cookie>cookieID</cookie>
            //OPTIONAL <digital_cert_link>www.mydigitalcertificate.com/
JohnDoeDaDoeDoe@gmail.com/mycertifcate.dc</digital_cert_link>
            //OPTIONAL <digital_certificate>_DATA_</digital_certificate>
        </user_account_credentials>
    </user_accounts_details>
    <client_details> //iOS Client with App and Webkit
        //it should be noted that although several client details
        //sections are provided to show example variants of client
        //sources, further messages will include only on to save
        //space
        <client_IP>10.0.0.123</client_IP>
        <user_agent_string>Mozilla/5.0 (iPhone; CPU iPhone OS 7_1_1 like Mac OS X)
AppleWebKit/537.51.2 (KHTML, like Gecko) Version/7.0 Mobile/11D201 Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXD</client_UDID>
        <client_OS>iOS</client_OS>
```

```
            <client_OS_version>7.1.1</client_OS_version>
            <client_app_type>app with webkit</client_app_type>
            <app_installed_flag>true</app_installed_flag>
            <app_name>MSM.app</app_name>
            <app_version>1.0 </app_version>
            <app_webkit_name>Mobile Safari</client_webkit_name>
            <client_version>537.51.2</client_version>
    </client_details>
    <client_details> //iOS Client with Webbrowser
            <client_IP>10.0.0.123</client_IP>
            <user_agent_string>Mozilla/5.0 (iPhone; CPU iPhone OS 7_1_1 like Mac OS X)
    AppleWebKit/537.51.2 (KHTML, like Gecko) Version/7.0 Mobile/11D201 Safari/9537.53</user_agent_string>
            <client_product_type>iPhone6,1</client_product_type>
            <client_serial_number>DNXXX1X1XXXX</client_serial_number>
            <client_UDID>3XXXXXXXXXXXXXXXXXXXXXXXXD</client_UDID>
            <client_OS>iOS</client_OS>
            <client_OS_version>7.1.1</client_OS_version>
            <client_app_type>web browser</client_app_type>
            <client_name>Mobile Safari</client_name>
            <client_version>9537.53</client_version>
    </client_details>
    <client_details> //Android Client with Webbrowser
            <client_IP>10.0.0.123</client_IP>
            <user_agent_string>Mozilla/5.0 (Linux; U; Android 4.0.4; en-us; Nexus S Build/IMM76D)
    AppleWebKit/534.30 (KHTML, like Gecko) Version/4.0 Mobile Safari/534.30</user_agent_string>
            <client_product_type>Nexus S</client_product_type>
            <client_serial_number>YXXXXXXXXZ</client_serial_number>
            <client_UDID>FXXXXXXXXX-XXXX-XXXX-XXXX-XXXXXXXXXXXX</client_UDID>
            <client_OS>Android</client_OS>
            <client_OS_version>4.0.4</client_OS_version>
            <client_app_type>web browser</client_app_type>
            <client_name>Mobile Safari</client_name>
            <client_version>534.30</client_version>
    </client_details>
    <client_details> //Mac Desktop with Webbrowser
            <client_IP>10.0.0.123</client_IP>
            <user_agent_string>Mozilla/5.0 (Macintosh; Intel Mac OS X 10_9_3) AppleWebKit/537.75.14
    (KHTML, like Gecko) Version/7.0.3 Safari/537.75.14</user_agent_string>
            <client_product_type>MacPro5,1</client_product_type>
            <client_serial_number>YXXXXXXXXZ</client_serial_number>
            <client_UDID>FXXXXXXXXX-XXXX-XXXX-XXXX-XXXXXXXXXXXX</client_UDID>
            <client_OS>Mac OS X</client_OS>
            <client_OS_version>10.9.3</client_OS_version>
            <client_app_type>web browser</client_app_type>
            <client_name>Mobile Safari</client_name>
            <client_version>537.75.14</client_version>
    </client_details>
    <message>
            <message_identifier>ID_message_10</message_identifier>
            <team_identifier>ID_team_1</team_identifier>
            <channel_identifier>ID_channel_1</channel_identifier>
            <contents>That is an interesting invention. I have attached a copy our patent policy.</contents>
            <attachments>patent_policy.pdf</attachments>
    </message>
</auth_request>
```

In the illustrated embodiment, the group-based communication platform 114 comprises a plurality of message distribution servers 110 configured to receive messages transmitted between a plurality of client devices 102-106 within a channel identified by a channel identifier and/or a group identifier, and to facilitate dissemination of those messages among client devices 102-106 that collectively form the membership of the communication channel.

In some embodiments, data indicating responses may be associated with the message. For example, responses to the message by other users may include reactions (e.g., selection of an emoji associated with the message, selection of a "like" button associated with the message), clicking on a hyperlink embedded in the message, replying to the message (e.g., posting a message to the group-based communication channel interface in response to the message), downloading a file associated with the message, sharing the message from one group-based communication channel to another group-based communication channel, pinning the message, starring the message, and/or the like. In one implementation, data regarding responses to the message by other users may be included with the message, and the message may be parsed (e.g., using PHP commands) to determine the responses. In another implementation, data regarding responses to the message may be retrieved from a database. For example, data regarding responses to the message may be retrieved via a MySQL database command similar to the following:

```
SELECT messageResponses
FROM MSM_Message
WHERE messageID = ID_message_10.
```

For example, data regarding responses to the message may be used to determine context for the message (e.g., a social score for the message from the perspective of some user). In another example, data regarding responses to the message may be analyzed to determine context regarding the user (e.g., the user's expertise in a topic may be determined based on the responses to the user's message regarding the topic).

In embodiments, attachments may be included with the message. If there are attachments, file objects may be associated with the message. In one implementation, the message may be parsed (e.g., using PHP commands) to determine file names of the attachments. For example, file contents may be analyzed to determine context for the message (e.g., a patent policy document may indicate that the message is associated with the topic "patents").

In embodiments, third party metadata may be associated with the message. For example, third party metadata may provide additional context regarding the message or the user that is specific to a company, group, group-based communication channel, and/or the like. In one implementation, the message may be parsed (e.g., using PHP commands) to determine third party metadata. For example, third party metadata may indicate whether the user who sent the message is an authorized representative of the group-based communication channel (e.g., an authorized representative may be authorized by the company to respond to questions in the group-based communication channel).

In embodiments, a conversation primitive may be associated with the message. In one implementation, a conversation primitive is an element used to analyze, index, store, and/or the like messages. For example, the message may be analyzed by itself, and may form its own conversation primitive. In another example, the message may be analyzed along with other messages that make up a conversation, and the messages that make up the conversation may form a conversation primitive. In one implementation, the conversation primitive may be determined as the message, a specified number (e.g., two) of preceding messages and a specified number (e.g., two) of following messages. In another implementation, the conversation primitive may be determined based on analysis of topics discussed in the message and other messages (e.g., in the channel) and/or proximity (e.g., message send order proximity, message send time proximity) of these messages.

In embodiments, various metadata, determined as described above, and/or the contents of the message may be used to index the message (e.g., using the conversation primitive) and/or to facilitate various facets of searching (i.e., search queries that return results from the message distribution servers 107). Metadata associated with the message may be determined and the message may be indexed in the message distribution server(s) 110. In one embodiment, the message may be indexed such that a company's or a group's messages are indexed separately (e.g., in a separate index associated with the group and/or company that is not shared with other groups and/or companies). In one implementation, messages may be indexed at a separate distributed repository (e.g., to facilitate data isolation for security purposes). If there are attachments associated with the message, file contents of the associated files may be used to index such files in the message distribution server(s) 110 to facilitate searching. In one embodiment, the files may be indexed such that a company's or a group's files are indexed at a separate distributed repository. Similarly, as discussed herein, app data associated with various external call systems and/or processing actions may be stored in association with a particular group's messages, such that app data associated with a plurality of groups are stored separately.

Examples of electronic message exchange among one or more client devices 102-106 and the group-based communication platform 114 are described below in reference to FIG. 1.

As shown in FIG. 1, the group-based communication platform 114 enables individual client devices 102-106 to exchange messages with one another and to interact with one or more external call systems 112. To exchange messages between client devices 102-106, individual client devices 102-106 transmit messages (e.g., text-based messages, file objects, video and/or audio streams, and/or the like) to the group-based communication platform 114. Those messages are ultimately provided to one or more message distribution server(s) 110, which indexes the messages and distributes those messages to the intended recipients (e.g., client devices 102-106) of the message.

In accordance with the embodiment shown in FIG. 1, the client devices 102-106 are configured to display the received messages in a contextually-relevant user interface available to the user of the client device. For example, messages transmitted from a first client device 102 as a part of a group-based communication channel are displayed in a user interface display on client devices 102-106 associated with other members of the group-based communication channel.

As discussed in greater detail herein, messages may be provided to external call systems 112 to initiate one or more calls (e.g., video- and/or audio-calls) executable within the respective external call system. In certain embodiments, calls may be executed to provide real time data exchange between client devices 102-106 of audio-based data and/or video-based data. Calls may be executed via integrated calling features of the group-based communication platform, such that call-related data is exchanged via one or more message distribution server(s) 110 of the group-based communication platform, or the calls may be executed via calling features of an external call system 112, such that call data is exchanged via one or more servers integrated with the respective external call system 112. As discussed herein, the calls may be recorded (e.g., by a message distribution server(s) 110 and/or by a server of a particular external call system 112), such that recordings and/or automatically generated call transcripts may be provided to a message distribution server(s) 110 and ultimately disseminated via a communication channel of the group-based communication platform 114.

Example Apparatuses Utilized with Various Embodiments

Figure 2:
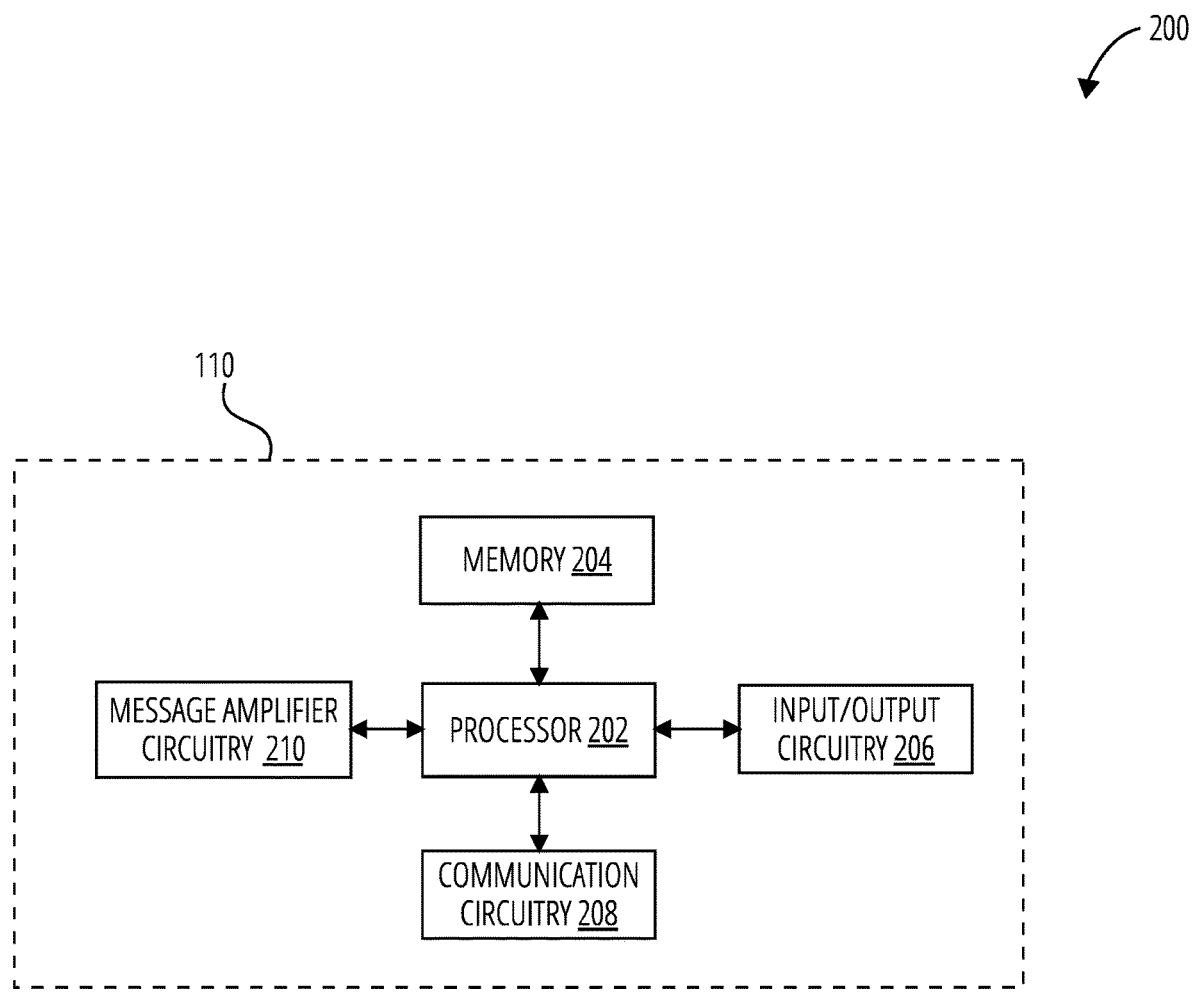
FIG. 2 illustrates an apparatus 200 of a message distribution server(s) 110 in accordance with one embodiment.

Each message distribution server(s) 110 may be embodied by one or more computing systems, such as apparatus 200 shown in FIG. 2. The apparatus 200 may include processor 202, memory 204, input/output circuitry 206, communication circuitry 208, and message amplifier circuitry 210. The apparatus 200 may be configured to execute the operations described herein with respect to FIG. 5. Although these components 202-210 are described with respect to functional limitations, it should be understood that the particular implementations necessarily include the use of particular hardware. It should also be understood that certain of these components 202-210 may include similar or common hardware. For example, two sets of circuitries may both leverage use of the same processor, network interface, storage medium, or the like to perform their associated functions, such that duplicate hardware is not required for each set of circuitries.

In some embodiments, the processor 202 (and/or co-processor or any other processing circuitry assisting or otherwise associated with the processor) may be in communication with the memory 204 via a bus for passing information among components of the apparatus. The memory 204 is non-transitory and may include, for example, one or more volatile and/or non-volatile memories. In other words, for example, the memory 204 may be an electronic storage device (e.g., a computer-readable storage medium). The memory 204 may be configured to store information, data, content, applications, instructions, or the like for enabling the apparatus 200 to carry out various functions in accordance with example embodiments of the present invention.

The processor 202 may be embodied in a number of different ways and may, for example, include one or more processing devices configured to perform independently. In some preferred and non-limiting embodiments, the processor 202 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 202 may be configured to execute instructions stored in the memory 204 or otherwise accessible to the processor 202. In some preferred and non-limiting embodiments, the processor 202 may be configured to execute hard-coded functionalities. As such, whether configured by hardware or software methods, or by a combination thereof, the processor 202 may represent an entity (e.g., physically embodied in circuitry) capable of performing operations according to an embodiment of the present invention while configured accordingly. Alternatively, as another example, when the processor 202 is embodied as an executor of software instructions, the instructions may specifically configure the processor 202 to perform the algorithms and/or operations described herein when the instructions are executed.

As just one example, the processor 202 may be configured to maintain one or more communication channels connecting a plurality of client devices 102-106 to enable message sharing therebetween. The processor 202 ensures that messages intended for exchange between the client devices 102-106 within the particular communication channel are properly disseminated to those client devices 102-106 for display within respective display windows provided via the client devices 102-106.

Moreover, the processor 202 may be configured to synchronize messages exchanged on a particular communication channel with a database for storage and/or indexing of messages therein. In certain embodiments, the processor 202 may provide stored and/or indexed messages for dissemination to client devices 102-106.

In some embodiments, the apparatus 200 may include input/output circuitry 206 that may, in turn, be in communication with processor 202 to provide output to the user and, in some embodiments, to receive an indication of a user input. The input/output circuitry 206 may comprise a user interface and may include a display, and may comprise a web user interface, a mobile application, a client device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communication circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communication circuitry 208 may include, for example, a network interface for enabling communications with a wired or wireless communication network. For example, the communication circuitry 208 may include one or more network interface cards, antennae, buses, switches, routers, modems, and supporting hardware and/or software, or any other device suitable for enabling communications via a network. Additionally or alternatively, the communication circuitry 208 may include the circuitry for interacting with the antenna/antennae to cause transmission of signals via the antenna/antennae or to handle receipt of signals received via the antenna/antennae.

Message amplifier circuitry 210 includes hardware configured to copy and amplify electronic messages and associated metadata received from one or more client devices 102-106 to other client devices 102-106 based on database shard(s). The message amplifier circuitry 210 may utilize processing circuitry, such as the processor 202, to perform these actions. However, it should also be appreciated that, in some embodiments, the message amplifier circuitry 210 may include a separate processor, specially configured Field Programmable Gate Array (FPGA), or Application Specific Integrated Circuit (ASIC) for performing the functions described herein. The message amplifier circuitry 210 may be implemented using hardware components of the apparatus 200 configured by either hardware or software for implementing these planned functions.

It is also noted that all or some of the information discussed herein can be based on data that is received, generated and/or maintained by one or more components of apparatus 200. In some embodiments, one or more external systems (such as a remote cloud computing and/or data storage system) may also be leveraged to provide at least some of the functionality discussed herein.

The term "circuitry" should be understood broadly to include hardware and, in some embodiments, software for configuring the hardware. With respect to components of each apparatus 200, the term "circuitry" as used herein should therefore be understood to include particular hardware configured to perform the functions associated with the particular circuitry as described herein. For example, in some embodiments, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 204 may provide storage functionality, the communication circuitry 208 may provide network interface functionality, and the like.

As will be appreciated, any such computer program instructions and/or other type of code may be loaded onto a computer, processor or other programmable apparatus's circuitry to produce a machine, such that the computer, processor or other programmable circuitry that execute the code on the machine creates the means for implementing various functions, including those described herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Moreover, although not shown, various embodiments of a group-based communication platform may comprise one or more databases configured for storing and/or indexing messages exchanged within various group-based communication channels.

Figure 3:
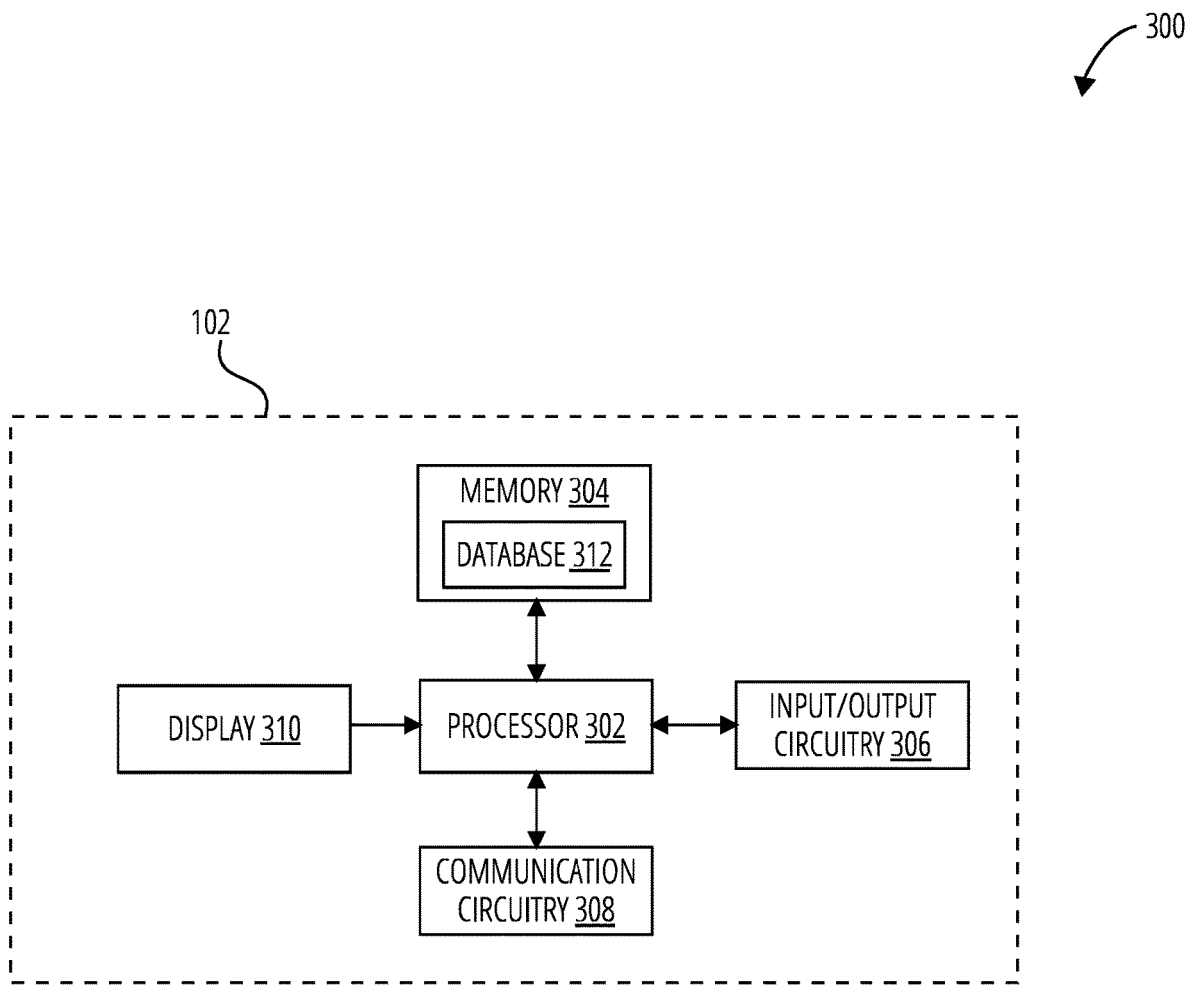
FIG. 3 illustrates an apparatus 300 of a client device in accordance with one embodiment.

Referring now to FIG. 3, a client device 102 (e.g., client devices 102-106) may be embodied by one or more computing systems, such as apparatus 300 shown in FIG. 3. The apparatus 300 may include processor 302, memory 304 which includes a database 312 (e.g., also referred to herein as permitted database 312), input/output circuitry 306, communication circuitry 308, and display 310. Although these components 302-312 are described with respect to functional limitations, it should be understood that the particular implementations necessarily include the use of particular hardware. It should also be understood that certain of these components 302-312 may include similar or common hardware. For example, two sets of circuitries may both leverage use of the same processor, network interface, storage medium, or the like to perform their associated functions, such that duplicate hardware is not required for each set of circuitries.

In some embodiments, the processor 302 (and/or co-processor or any other processing circuitry assisting or otherwise associated with the processor) may be in communication with the memory 304 via a bus for passing information among components of the apparatus. The memory 304 is non-transitory and may include, for example, one or more volatile and/or non-volatile memories. In other words, for example, the memory 304 may be an electronic storage device (e.g., a computer-readable storage medium). The memory 304 may include one or more databases. Furthermore, the memory 304 may be configured to store information, data, content, applications, instructions, or the like for enabling the apparatus 300 to carry out various functions in accordance with example embodiments of the present invention. The memory 304 may include a database 312 which may store group-based communication platform query data and/or data files indicative of prior activity of the client device 102 with respect to one or more communication channels (e.g., recent content exchange; recent views of group-based communication channels; and/or the like). These data files may be utilized by the processor 202 when crafting search parameters (e.g., automatically) to be presented to the message distribution server(s) 110 when searching for group-based communication channels.

The processor 302 may be embodied in a number of different ways and may, for example, include one or more processing devices configured to perform independently. In some preferred and non-limiting embodiments, the processor 302 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 302 may be configured to execute instructions stored in the memory 304 or otherwise accessible to the processor 302. In some preferred and non-limiting embodiments, the processor 302 may be configured to execute hard-coded functionalities. As such, whether configured by hardware or software methods, or by a combination thereof, the processor 302 may represent an entity (e.g., physically embodied in circuitry) capable of performing operations according to an embodiment of the present invention while configured accordingly. Alternatively, as another example, when the processor 302 is embodied as an executor of software instructions (e.g., computer program instructions), the instructions may specifically configure the processor 302 to perform the algorithms and/or operations described herein when the instructions are executed.

In some embodiments, the apparatus 300 may include input/output circuitry 306 that may, in turn, be in communication with processor 302 to provide output to the user and, in some embodiments, to receive an indication of a user input. The input/output circuitry 306 may comprise a user interface and may include a display 310, and may comprise a web user interface, a mobile application, a client device, a kiosk, or the like. In some embodiments, the input/output circuitry 306 may also include a keyboard, a mouse, a joystick, a touch screen, touch areas, soft keys, a microphone, a speaker, a camera (e.g., a video camera and/or a still camera) or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 304, and/or the like). For example, a microphone and/or a video camera may be initiated to collect data upon initiation of a call.

The communication circuitry 308 may be any means such as a device or circuitry embodied in either hardware or a combination of hardware and software that is configured to receive and/or transmit data from/to a network and/or any other device, circuitry, or module in communication with the apparatus 300. In this regard, the communication circuitry 308 may include, for example, a network interface for enabling communications with a wired or wireless communication network. For example, the communication circuitry 308 may include one or more network interface cards, antennae, buses, switches, routers, modems, and supporting hardware and/or software, or any other device suitable for enabling communications via a network. Additionally or alternatively, the communication circuitry 308 may include the circuitry for interacting with the antenna/antennae to cause transmission of signals via the antenna/antennae or to handle receipt of signals received via the antenna/antennae.

It is also noted that all or some of the information discussed herein can be based on data that is received, generated and/or maintained by one or more components of apparatus 300. In some embodiments, one or more external systems (such as a remote cloud computing and/or data storage system) may also be leveraged to provide at least some of the functionality discussed herein.

Figure 4:
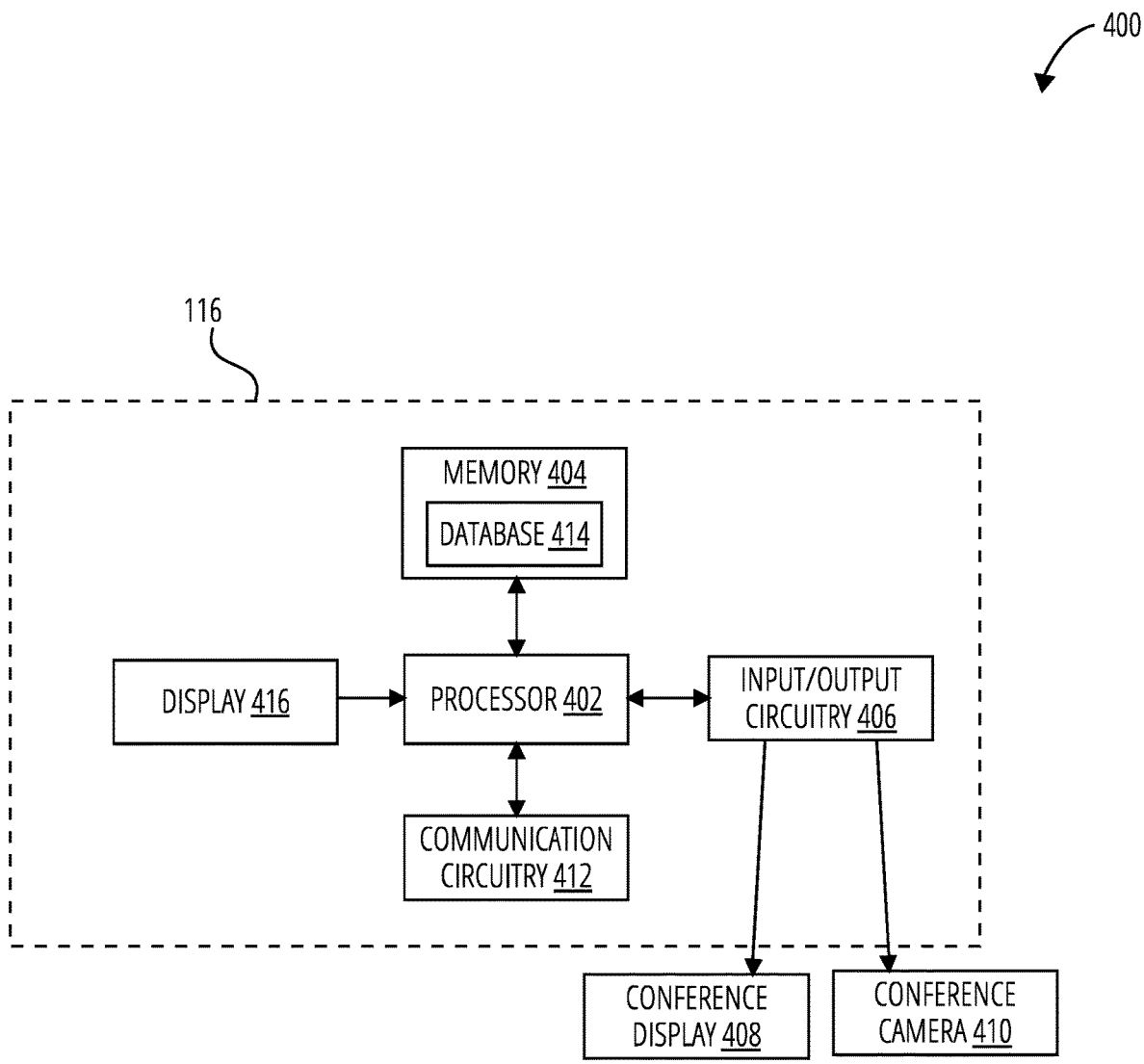
FIG. 4 illustrates an apparatus 400 in accordance with one embodiment.

Referring now to FIG. 4, a video call device 116 may be embodied by one or more computing systems, such as apparatus 400 shown in FIG. 4. The apparatus 400 may include processor 402, memory 404 which includes a database 414 (e.g., also referred to herein as permitted database 414), input/output circuitry 406, communication circuitry 412, and display 416. Although these components are described with respect to functional limitations, it should be understood that the particular implementations necessarily include the use of particular hardware. It should also be understood that certain of these components may include similar or common hardware. For example, two sets of circuitries may both leverage use of the same processor, network interface, storage medium, or the like to perform their associated functions, such that duplicate hardware is not required for each set of circuitries.

In some embodiments, the processor 402 (and/or co-processor or any other processing circuitry assisting or otherwise associated with the processor) may be in communication with the memory 404 via a bus for passing information among components of the apparatus. The memory 404 is non-transitory and may include, for example, one or more volatile and/or non-volatile memories. In other words, for example, the memory 404 may be an electronic storage device (e.g., a computer-readable storage medium). The memory 404 may include one or more databases. Furthermore, the memory 404 may be configured to store information, data, content, applications, instructions, or the like for enabling the apparatus 400 to carry out various functions in accordance with example embodiments of the present invention.

The processor 402 may be embodied in a number of different ways and may, for example, include one or more processing devices configured to perform independently. In some preferred and non-limiting embodiments, the processor 402 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 402 may be configured to execute instructions stored in the memory 404 or otherwise accessible to the processor 402. In some preferred and non-limiting embodiments, the processor 402 may be configured to execute hard-coded functionalities. As such, whether configured by hardware or software methods, or by a combination thereof, the processor 402 may represent an entity (e.g., physically embodied in circuitry) capable of performing operations according to an embodiment of the present invention while configured accordingly. Alternatively, as another example, when the processor 402 is embodied as an executor of software instructions (e.g., computer program instructions), the instructions may specifically configure the processor 402 to perform the algorithms and/or operations described herein when the instructions are executed.

In some embodiments, the apparatus 400 may include input/output circuitry 406 that may, in turn, be in communication with processor 402 to provide output to the user and, in some embodiments, to receive an indication of a user input. The input/output circuitry 406 may comprise a user interface and may include a display 416, and may comprise a web user interface, a mobile application, a kiosk, or the like. In some embodiments, the input/output circuitry 406 may also include a keyboard, a mouse, a joystick, a touch screen, touch areas, soft keys, a microphone, a speaker, a camera (e.g., a video camera and/or a still camera) or other input/output mechanisms. Moreover, the input/output circuitry 406 may further be in communication with a separate conference display 408, such as an LCD television monitor, a projector, and/or the like; and/or a separate conference camera 410, such as a high-definition video camera configured for capturing video for streaming services (e.g., via video conferencing platforms). The processor and/or user interface circuitry comprising the processor may be configured to control one or more functions of one or more user interface elements through computer program instructions (e.g., software and/or firmware) stored on a memory accessible to the processor (e.g., memory 404, and/or the like). For example, a microphone and/or a video camera may be initiated to collect data upon initiation of a call.

The communication circuitry 412 may be any means such as a device or circuitry embodied in either hardware or a combination of hardware and software that is configured to receive and/or transmit data from/to a network and/or any other device, circuitry, or module in communication with the apparatus 400. In this regard, the communication circuitry 412 may include, for example, a network interface for enabling communications with a wired or wireless communication network. For example, the communication circuitry 412 may include one or more network interface cards, antennae, buses, switches, routers, modems, and supporting hardware and/or software, or any other device suitable for enabling communications via a network. Additionally or alternatively, the communication circuitry 412 may include the circuitry for interacting with the antenna/antennae to cause transmission of signals via the antenna/antennae or to handle receipt of signals received via the antenna/antennae.

It is also noted that all or some of the information discussed herein can be based on data that is received, generated and/or maintained by one or more components of apparatus 4. In some embodiments, one or more external systems (such as a remote cloud computing and/or data storage system) may also be leveraged to provide at least some of the functionality discussed herein.

Video Call Proximity Detection

Figure 5:
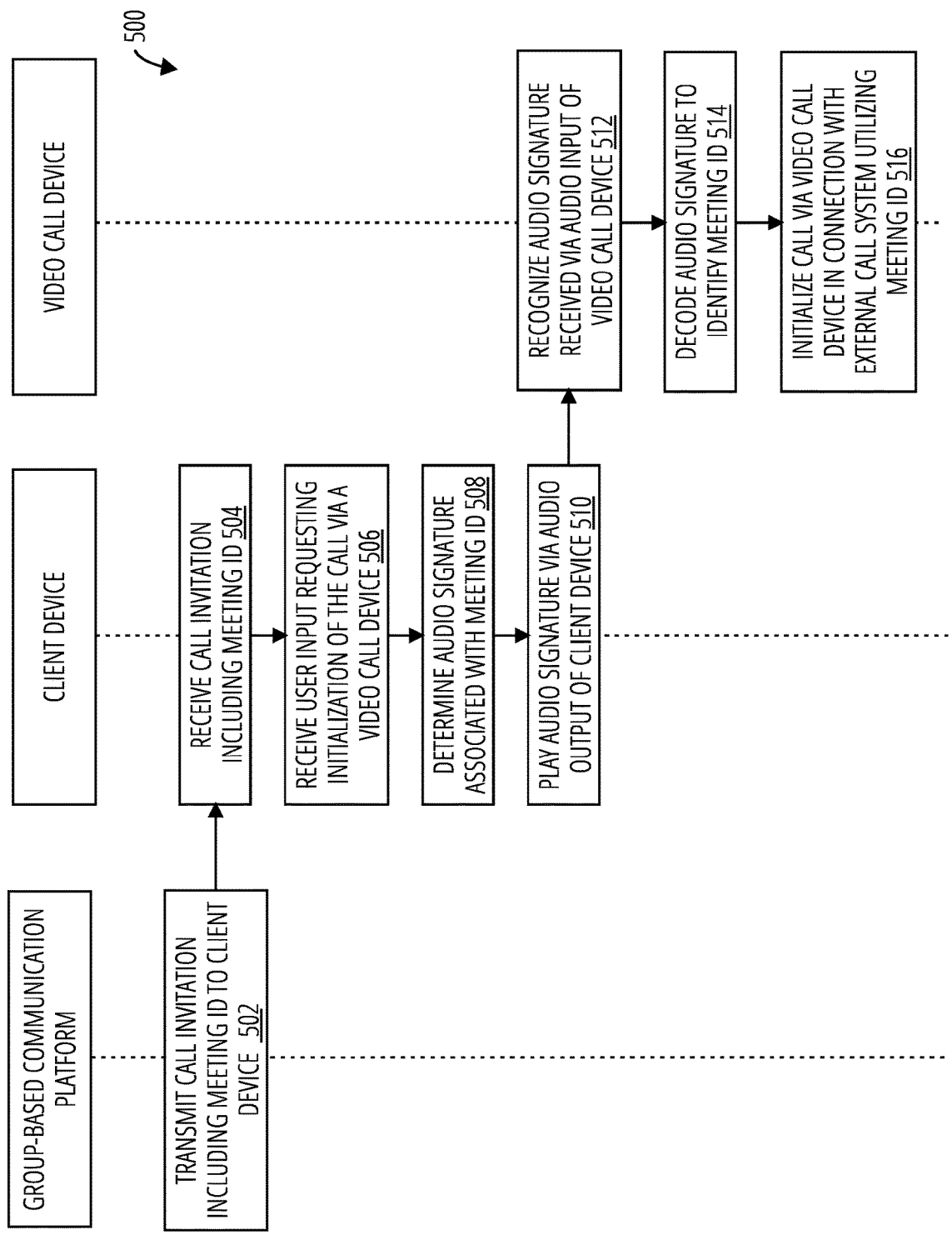
FIG. 5 illustrates a flowchart 500 including various functions performed to initiate/join a video call via a video call device 116 based on a unique audio signature emitted from a client device.

FIG. 5 illustrates various steps performed by various computing entities (including group-based communication platform 114, client device 102, and video call device 116) in initializing/joining a video call according to various embodiments. As discussed throughout this application, various embodiments enable a user of a client device 102 to quickly join a call (e.g., a video call, a voice call, and/or the like) via a video call device 116 (or audio-only call device having similar configurations to those discussed herein. Although the following description specifically focuses on video-call configurations, it should be understood that the described configurations are usable with audio-only call systems having configurations for detecting audio-signals emitted from nearby client devices. Thus, such configurations may be usable with video-call systems typical in conference rooms, audio-devices having a listening mode (e.g., Amazon Alexa devices, Google Home devices, mobile devices (e.g., other client devices) in communication with audio-systems and/or video-systems, and/or the like.

The configurations described herein are configured to enable users to initialize and/or join existing video calls using a video call device 116 as discussed herein. Accordingly, prior to initializing and/or joining such a call as discussed herein, a call must be scheduled or otherwise made available for call participants. For example, a first user may schedule a call having a meeting ID (e.g., selected by the user or automatically selected), for example, by an external call system 112 on which the call is to be executed (e.g., at a particular scheduled time). As a part of generating the call invitation and selecting a meeting ID, a unique audio signature corresponding to the meeting ID may be generated. In certain embodiments, the meeting ID and/or the unique audio signature may be generated via the external call system 112 on which the call will later be executed, and accordingly both the meeting ID and the corresponding unique audio signature may be unique among all meeting IDs and audio signatures operable via the external call system 112.

In certain embodiments, the external call system 112 may be configured to execute a translation algorithm for generating a unique audio signature based on the meeting ID, such that the meeting ID may be utilized to determine the unique audio signature without a stored mapping table. In such embodiments, one or more computing entities (e.g., client devices 102-106, group-based communication platform 114, video call device 116, and/or the like) may store data indicative of the unique algorithm, thereby enabling any of the computing devices to locally determine a unique audio signature corresponding to a particular meeting ID. In other embodiments, the unique audio signature may be randomly generated and mapped to a corresponding meeting ID (e.g., permanently mapped or temporarily mapped).

In certain embodiments, the unique audio signature may comprise a unique series of tones (e.g., having defined frequencies) that may be emitted by audio-output devices (e.g., speakers) of client devices 102-106. In certain embodiments, the unique audio signatures corresponding to meeting IDs operable via a particular external call system 112 may have a common "header" portion (e.g., a leading series of tones) indicative of the identity of the external call system 112 for which the following unique audio signature applies. As discussed in later detail herein, a video call device 116 may be configured for selecting a particular app or other connection mechanism for connecting with the external call system 112 based on the leading header series of tones. In other embodiments, the video call device 116 may be configured to prevent execution of the unique audio signature upon determining that the leading header series of tones indicates the unique audio signature is associated with an incompatible external call system 112.

In other embodiments, the unique audio signature may be configured for concatenation with a suffix series of tones indicative of the identity of the client device/user utilizing the unique audio signature, thereby enabling an external call system 112 to identify the participants joining a particular call. In such embodiments, the client device 102 may be configured to concatenate the unique audio signature with a user-specific audio signature. However, it should be understood that in various embodiments the unique audio signature is usable individually, without additional information provided therewith.

In various embodiments, the unique audio signature may be inaudible to humans (e.g., the tones included within the unique audio signature may be at a frequency outside of the human-audible range). In certain embodiments, the series of tones may be supersonic and may each have a frequency above 20 kHz. In other embodiments, the series of tones may be audible to humans (e.g., within a frequency range of 20 Hz and 20 kHz). In yet other embodiments, the series of tones may be inaudible to humans (e.g., supersonic tones), but may be overlaid over a human-audible series of tones that may provide a sensory indication to a user indicating that the unique audible signature is being played for a nearby video call device 116 when requested.

As discussed in greater detail herein, a meeting ID may not be associated with a specific unique audio signature, and an external call system 112 (and video call device 116) may be configured to identify an appropriate call to initialize/join based at least in part on other data that may be provided from a client device 102-106 via one or more audio signals. For example, an audio signal emitted from a client device 102-106 may be specific to a particular external call system 112 for which a video call device 116 is associated (determined by the client device 102 based on an audio signal emitted by the video call device 116), but may not include data identifying a particular meeting as stored on the client device 102. Instead, a responsive audio signal emitted by the client device 102 may be indicative of an identity of a user associated with the client device 102, may include echoed data (e.g., audio signals) detected from the video call device 116, and/or like. The video call device 116 and/or the external call system 112 associated therewith may thereafter determine an appropriate call (e.g., and meeting ID) to initialize/join based on the audio signals received from the client device 102, and may thereafter initialize/join the call via the video call device 116.

After generating the call invitation (including the meeting ID and/or the unique audio signature) the user may then disseminate a meeting invitation via one or more communication mechanisms. As just one example, the call invitation may be disseminated via a group-based communication platform 114 (e.g., as a message) configured to relay the call invitation to invitees' client devices 102-106, as indicated at block 502. In certain embodiments, the call invitation may additionally comprise data indicative of one or more conference rooms, conference environments, video call devices 116, and/or the like to be utilized with the scheduled call, and the call invitation may be disseminated to those video call devices 116 as well (e.g., via the group-based communication platform 114, via the external call system 112, and/or the like). The call invitation may be utilized by the video call devices 116 to emit audio signals that may be detected by client devices 102-106 within range of the video call device 116 to initialize an audio handshake methodology between detecting client devices 102-106 and the video call device 116. As discussed herein, the audio handshake methodology may be initialized with client devices 102-106 detecting the audio signal emitted by the video call device 116 and transmitting a responsive audio signal indicative of the identity of the client device 102 (and/or the user associated with the client device 102), indicative of an echoed audio signal generated based on the audio signal emitted by the video call device 116, and/or the like. Upon determining that the responsive audio signal detected at the video call device 116 satisfies one or more criteria, the video call device 116 initializes/joins the call scheduled for the video call device 116 at the current time.

The client devices 102-106 associated with invitees thereafter receives the disseminated call invitation, as indicated at block 504. The call invitation may be displayed on receiving client devices 102-106 via a particular user interface configuration, which may have one or more user-input elements therein. In certain embodiments, the call invitation may be displayed with scheduling information indicative of the time and/or date at which the call is scheduled, as well as one or more options for joining the scheduled call. The options for joining the call may comprise a user input element for joining the video call using the client device 102 (e.g., such that the video is displayed via a display 310 of the client device 102, video of the user is generated from a camera on the client device 102, and audio is exchanged with the user via speaker(s) and microphones on the client device 102). The options for joining the call may additionally comprise an option for joining the call via a nearby video call device 116. Selection of this option may cause the client device to play the unique audio signature, as discussed herein. In certain embodiments, the options for joining the call may additionally comprise an option for manually providing the meeting ID to a video call device 116, such that the meeting ID is visually included in the call invitation.

In certain embodiments, the client device 102 is configured to receive user input requesting initialization/joining of the call via a nearby video call device 116 (the second option discussed above) as indicated at block 506. In other embodiments, the client device 102 may detect a unique audio signal emitted by a nearby video call device 116, and that unique audio signal may be indicative of the identity of the video call device 116, the identity of an external call system 116 associated with the video call device 116, the identity of a call scheduled to be initialized/joined via the video call device 116 (e.g., a meeting ID), and/or the like. The client device 102 may thereafter determine an appropriate unique audio signature to be transmitted to the video call device 116 in response to the trigger event (e.g., user input or receipt of an audio signal from the video call device 116). The unique audio signature to be transmitted from the client device 102 may correspond to the meeting ID, as indicated at block 508, or may be a responsive audio signal indicative of the identity of the client device 102 (and/or the identity of an associated user), and/or may comprise echo audio signals generated based at least in part on the audio signal detected from the video call device 116. The client device 102 may determine the unique audio signature locally (e.g., utilizing a locally-stored algorithm for converting the meeting ID into a unique audio signature, by retrieving a unique audio signature transmitted to the client device 102 as a part of the call invitation and stored locally on the client device 102, by deciphering the audio signal received from the video call device 116, and/or the like). In other embodiments, the client device 102 is configured for requesting the unique audio signature from one or more other computing systems (e.g., the group-based communication platform 114 and/or external call system 112) via a network connection between the client device 102 and the one or more other computing systems. In the latter embodiments, the group-based communication platform 114 or the external call system 112 may be configured to determine the unique audio signature (e.g., via an algorithm for translating the meeting ID into a unique audio signature and/or for determining the appropriate unique audio signature from a mapping table stored in one or more associated databases), and may provide the unique audio signature to the client device 102 in response to the request.

Figure 6:
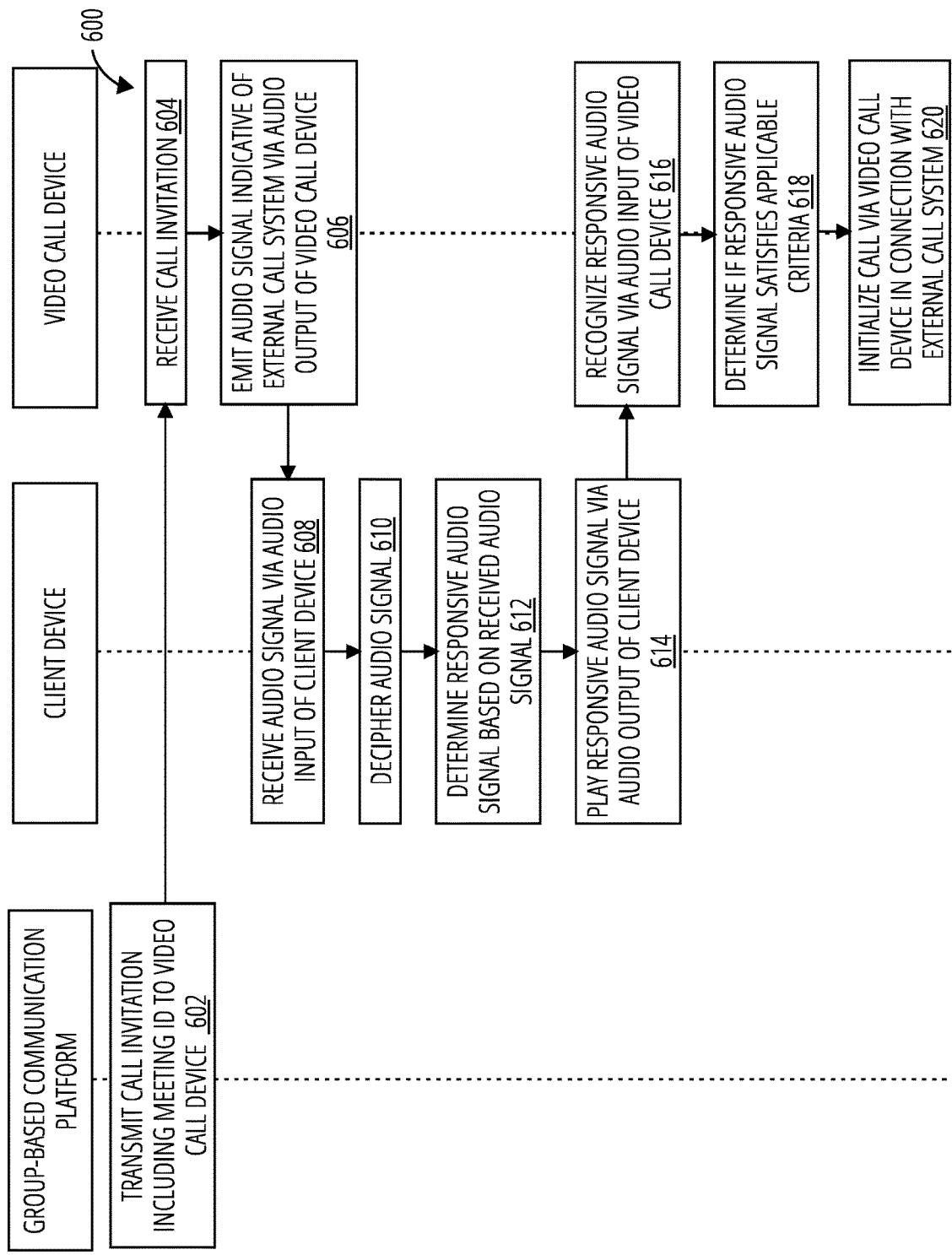
FIG. 6 illustrates a flowchart 600 including various functions performed to initiate/join a video call via a video call device 116 according to one embodiment.

The client device 102 may thereafter play the unique audio signature via audio output device included at the client device 102, as indicated at block 510. As discussed herein, the unique audio signature may be inaudible to humans, such that a user cannot hear the unique audio signature played by the client device 102. In other embodiments, the unique audio signature may be within the human-detectable audible frequency range, or the unique audio signature may be inaudible to humans but may be overlaid on a human-detectable audio signature, thereby providing an audible confirmation to the user that the unique audio signature is successfully played by the client device 102. FIG. 6 provides a visual schematic view of a client device 102 playing a unique audio signature to a nearby video call device 116 according to one embodiment.

As discussed herein, the unique audio signature corresponding to the meeting ID may be concatenated with a user-specific audio signature (e.g., that may be generated according to an algorithm for translating the user's user identifier into a unique audio user identifier, by assigning a unique audio user identifier that may be mapped to the user identifier, and/or the like). By concatenating the unique audio user identifier with the unique audio signature of the meeting ID, the client device 102 conveys data indicative of the call to be joined, as well as the identity of the user joining the call, thereby enabling the video call device 116 to provide the identity of the user joining the call to the external call system 112 such that the external call system 112 may track the users who joined the call.

In other embodiments, the audio signature emitted by the client device 102 includes only the user-specific audio signature, and the video call device 116 (and/or the external call device 112) may utilize the user-specific audio signature to determine a call to initialize/join for which the user is invited.

In certain embodiments, the video call device 116 is configured for operating in a listening mode for detecting audio signatures that may be usable by the video call device 116. Thus, the unique audio signature may comprise a leading header series of tones configured to trigger a detecting video call device 116 to process the subsequently conveyed unique audio signature (and unique audio user identifier) to join/initiate a call. Accordingly, as indicated at block 512, the video call device 116 is configured to recognize the unique audio signature received via an audio input (e.g., a microphone) of the video call device 116. The video call device 116 thereafter decodes the unique audio signature (e.g., locally, utilizing an algorithm for translating the unique call signature into a meeting ID, or by generating an audio file including the recorded unique audio signature and transmitting the audio file to the group-based communication platform 114 and/or external call system 112 for translation into a meeting ID). The video call device 116 (e.g., together with the external call system 112) initializes/joins the video call to enable communication with other users connected with the call as indicated at block 516.

As discussed herein, the unique audio signature may be concatenated with a unique audio user identifier. Thus, the video call device 116 may be configured to decode the received unique audio user identifier (e.g., locally or by transmitting an audio file including the recorded unique audio user identifier to the external call system 112 for decoding) and/or may provide the unique audio user identifier to the external call system 112, which may be configured for monitoring the identity of users joining the call via a video call device 116 or via a client device.

FIG. 6 provides a flowchart 600 illustrating methodologies/steps for joining a call according to a second embodiment in which a client device 102 performs an audio handshake with a video call device 116 upon receipt of an audio signal emitted from the video call device 116 by emitting an audio signature (e.g., a responsive audio signal) upon receipt of the audio signal emitted from the video call device 116.

As indicated at block 602 of FIG. 6, a group-based communication platform 114 (or external call system 112) transmits data indicative of a call invitation (which may comprise a meeting ID) to a video call device 116. The video call device 116 receiving the call invitation may be indicated as a call device to be utilized during the scheduled call, for example, within the call invitation. The video call device 116 may receive the call invitation, as indicated at block 604, and the video call device 116 thereafter emits an audio signal as indicated at block 606 (e.g., which may be audible or inaudible to humans) that may be detected by client devices 102-106 within a receiving range of the video call device 116 (e.g., within the same conference room as the video call device 116). The audio signal emitted from the video call device 116 may be meeting agnostic (in which case the steps indicated by blocks 602-604 may be omitted) and may be indicative of the identity of the video call device 116, the identity of an external call system 112 associated with the video call device 116, and/or the like. As yet another example, the audio signal emitted from the video call device 116 may be meeting specific (e.g., may comprise a meeting ID translated into an audio signal in a manner as discussed above), and may comprise data indicative of the identity of an external call system 112 associated with the video call device 116, and/or the like.

The video call device 116 may constantly emit the audio signal (e.g., repeating a series of tones that make up the audio signal), or the video call device 116 may emit the audio signal in response to particular trigger events. For example, upon determining that the current time is within a predefined elapsed time before the start of call scheduled for the video call device 116, the video call device 116 may begin emitting the audio signal, and the video call device 116 may repeat the audio signal emission until a second trigger event (e.g., upon initializing/joining a call, after a call is scheduled to end, and/or the like).

As indicated at block 608, once a client device 102 is brought in close proximity to the video call device 116 such that the client device 102 detects the audio signal emitted by the video call device 116, the client device 102 receives the audio signal emitted by the video call device 116, as indicated at block 608. The client device 102 (and/or a group-based communication platform 114) deciphers the received audio signal (which may be shared between the client device 102 and the group-based communication platform 114 via one or more wireless networks) as indicated at block 610 to determine an appropriate responsive audio signal, as indicated at block 612. The responsive audio signal may be determined to be a particular meeting ID (determined as discussed above), data indicative of the identity of the client device 112, an echoed audio signal comprising at least a portion of the audio signal received from the video call device 116, and/or the like. The client device 102 may thereafter emit the determined responsive audio signal, as indicated at block 614, which may be detected and recognized by the video call device 116, as indicated at block 616. In certain embodiments, the responsive audio signal emitted by the client device 102 may be emitted at an appropriate frequency and/or may comprise an appropriate series of tones that may be recognized by the video call device 116 based on the external call system 112 with which the video call device 116 is associated (e.g., a video call device 116 associated with a first external call system 112 may be configured to recognize signals emitted at a first frequency, and a video call device 116 associated with a second external call system 112 may be configured to recognize signals emitted at a second frequency), and accordingly the client device 102 emits signals that may be recognized by the video call device 116 based at least in part on the audio signal received from the video call device 116.

Once the video call device 116 receives the responsive audio signal from the client device 102, the video call device (and/or the external call system 112, which may receive the responsive audio signal via a transmission over a wireless network from the video call device 116) determines whether the responsive audio signal satisfies applicable criteria to initiate/join a call as indicated at block 618. For example, the video call device 116 (and/or the external call system 112) may determine whether the identity of a client device 102 emitting the responsive audio signal is listed as an invitee for a call scheduled for the video call device 116. As yet another example, the video call device 116 (and/or the external call system 112) may be configured to determine whether the echoed audio signal sufficiently matches the audio signal emitted by the video call device 116. As yet another example, the video call device 116 (and/or the external call system 112) may determine whether a meeting ID included within the responsive audio signal may be joined/initialized by the video call device 116. Other criteria may be utilized for determining whether the video call device 116 can initialize/join a call.

Once the video call device 116 (and/or the external call system 112) determines that applicable criteria are satisfied, the video call device 116 may initialize/join a call as requested, as indicated at block 620. The video call device 116 may first request user input from a nearby user confirming that the user would like to join the call (e.g., including data indicative of the identity of the call to be joined), and thereafter the video call device 116 may join/initialize the call in a manner similar to that discussed above.

Figure 7:
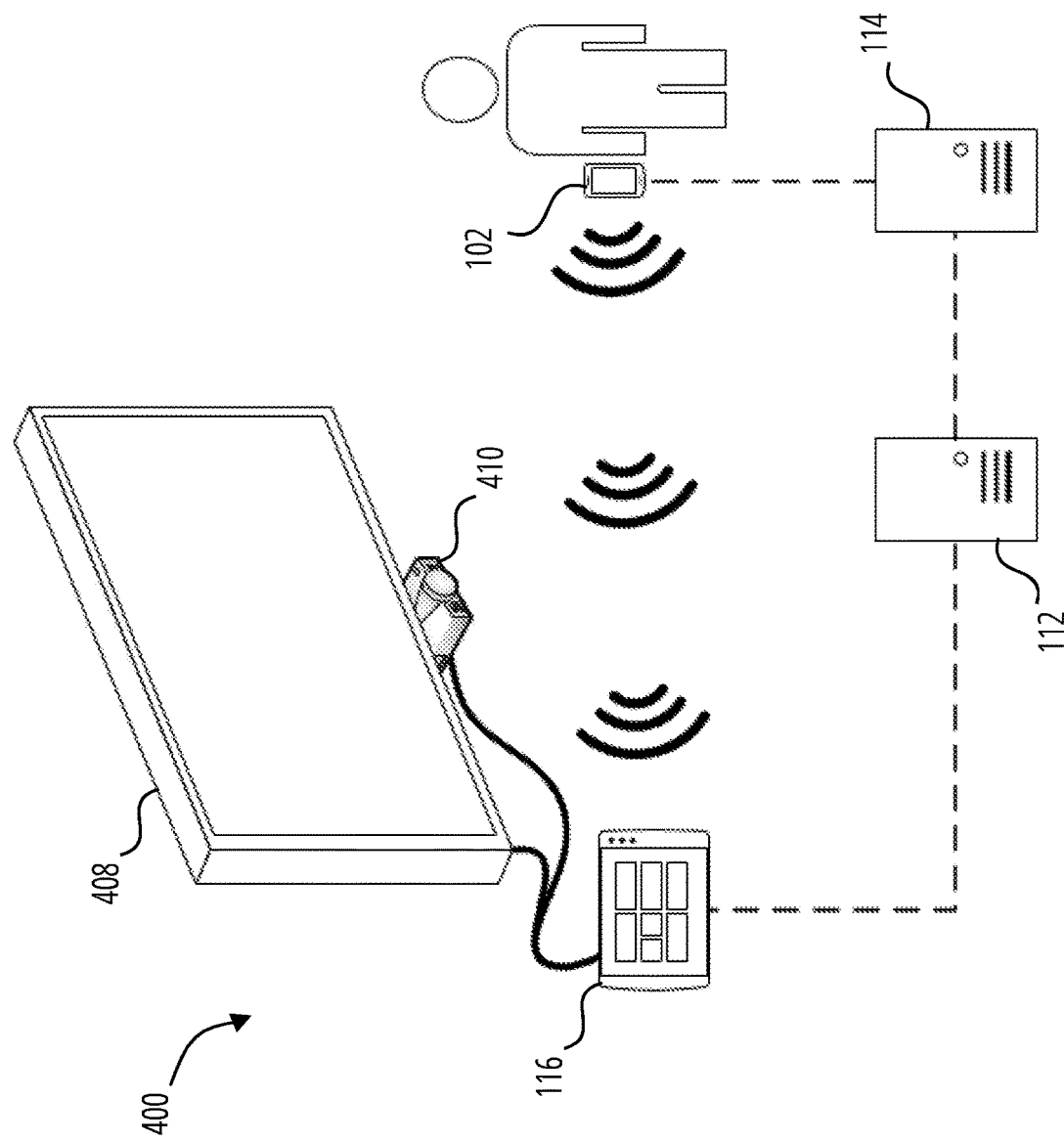
FIG. 7 illustrates an apparatus 400 within a conference environment of a system in accordance with one embodiment.

FIG. 7 schematically illustrates a client device 102 providing a unique audio signature to a video call device 116 to cause the video call device 116 to initialize/join a video call according to certain embodiments. As shown therein, the client device 102 is in electronic communication (e.g., via a communication network 108) with the group-based communication platform 114 and/or external call system 112 (directly or indirectly through the group-based communication platform 114). Thus, the client device 102 is configured to receive a meeting invite via the network, which includes data enabling the client device 102 to determine a unique audio signature corresponding to the meeting ID of the call to which the user was invited. The client device 102 may then play the unique audio signature which may be detectable by a video call device 116 in close proximity to the client device 102. Based on the received unique audio signature, the video call device 116 initializes/joins the associated call, utilizing a conference display 408 and/or conference camera 410 with the video call device 116.

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A system configured for activating a connection to a call, wherein the system comprises:
one or more non-transitory memory storage repositories; and
one or more processors, wherein the one or more processors are collectively configured to:
receive, at a call device, an invitation for the call, the invitation indicating the call device to be utilized during the call, wherein the invitation is further configured for reception by a client device associated with an invitee of the call;
output, at the call device, an initialization audio signal for the call based on the invitation;

receive, at the call device, a responsive audio signal comprising audio signature data from the client device in response to the initialization audio signal for the call and based at least in part on the client device being associated with the invitee of the call;

determine a meeting identifier based at least in part on the audio signature data, wherein the meeting identifier is associated with the call; and in response to determining the meeting identifier, establish a call connection for the call between the call device and an external call platform based at least in part on the determined meeting identifier and the invitation indicating the call device to be utilized during the call.

2. The system of claim 1, wherein determining the meeting identifier comprises:

querying a lookup table stored within the one or more non-transitory memory storage repositories based at least in part on the audio signature data, wherein the lookup table maps respective audio signature data with meeting identifiers; and in response to the querying, receiving the meeting identifier mapped to the audio signature data.

3. The system of claim 1, wherein the audio signature data comprises header data and meeting identifier data, and wherein determining the meeting identifier comprises:

determining, based at least in part on the header data of the audio signature data, the external call platform for the call; and determining, based at least in part on the meeting identifier data, the meeting identifier usable to initialize the call with the external call platform.

4. The system of claim 1, wherein establishing the call connection for the call comprises initializing a real-time call connection via a network between the call device and the external call platform.

5. The system of claim 4, wherein initializing the real-time call connection comprises initializing a real-time video call connection via the network between the call device and the external call platform.

6. The system of claim 1, wherein the one or more processors are further configured to:

receive a call generation request;

determine meeting identifier data for the call generation request;

generate the audio signature data based at least in part on the meeting identifier data; and transmit the audio signature data to one or more client devices comprising at least the client device, wherein the audio signature data causes the one or more client devices to emit an audio signal upon activation of the audio signature data.

7. The system of claim 1, wherein the audio signature data comprises user identifier data, and wherein the one or more processors are further configured to:

identify a user identifier as a participant in the call based at least in part on receipt of the user identifier data as a part of the audio signature data.

8. A computer-implemented method for activating a connection to a call, wherein the method comprises:

receiving, at a call device, an invitation for the call, the invitation indicating the call device to be utilized during the call, wherein the invitation is further configured for reception by a client device associated with an invitee of the call;

outputting, at the call device, an initialization audio signal for the call based on the invitation;

receiving, at the call device, a responsive audio signal comprising audio signature data from the client device in response to the initialization audio signal for the call and based at least in part on the client device being associated with the invitee of the call;

determining a meeting identifier based at least in part on the audio signature data, wherein the meeting identifier is associated with the call; and in response to determining the meeting identifier, establishing a call connection for the call between the call device and an external call platform based at least in part on the determined meeting identifier and the invitation indicating the call device to be utilized during the call.

9. The computer-implemented method of claim 8, wherein determining the meeting identifier comprises:

querying a lookup table based at least in part on the audio signature data, wherein the lookup table maps respective audio signature data with meeting identifiers; and in response to the querying, receiving the meeting identifier mapped to the audio signature data.

10. The computer-implemented method of claim 8, wherein the audio signature data comprises header data and meeting identifier data, and wherein determining the meeting identifier comprises:

determining, based at least in part on the header data of the audio signature data, the external call platform for the call; and determining, based at least in part on the meeting identifier data, the meeting identifier usable to initialize the call with the external call platform.

11. The computer-implemented method of claim 8, wherein establishing the call connection for the call comprises initializing a real-time call connection via a network between the call device and the external call platform.

12. The computer-implemented method of claim 11, wherein initializing the real-time call connection comprises initializing a real-time video call connection via the network between the call device and the external call platform.

13. The computer-implemented method of claim 8, further comprising:

receiving a call generation request;

determining meeting identifier data for the call generation request;

generating the audio signature data based at least in part on the meeting identifier data; and transmitting the audio signature data to one or more client devices comprising at least the client device, wherein the audio signature data causes the one or more client devices to emit an audio signal upon activation of the audio signature data.

14. The computer-implemented method of claim 8, wherein the audio signature data comprises user identifier data, and wherein the computer-implemented method further comprises:

identifying a user identifier as a participant in the call based at least in part on receipt of the user identifier data as a part of the audio signature data.

15. A non-transitory computer-readable storage medium storing one or more programs, the one or more programs comprising instructions, which when executed by one or more processors of a call device, cause the call device to:

receive, at the call device, an invitation for a call, the invitation indicating the call device to be utilized during the call, wherein the invitation is further configured for reception by a client device associated with an invitee of the call;

output, at the call device, an initialization audio signal for the call based on the invitation;

receive, at the call device, a responsive audio signal comprising audio signature data from the client device in response to the initialization audio signal for the call and based at least in part on the client device being associated with the invitee of the call;

determine a meeting identifier based at least in part on the audio signature data, wherein the meeting identifier is associated with the call; and in response to determining the meeting identifier, establish a call connection for the call between the call device and an external call platform based at least in part on the determined meeting identifier and the invitation indicating the call device to be utilized during the call.

16. The non-transitory computer-readable storage medium of claim 15, wherein determining the meeting identifier comprises:

querying a lookup table based at least in part on the audio signature data, wherein the lookup table maps respective audio signature data with meeting identifiers; and in response to the querying, receiving the meeting identifier mapped to the audio signature data.

17. The non-transitory computer-readable storage medium of claim 15, wherein the audio signature data comprises header data and meeting identifier data, and wherein determining the meeting identifier comprises:

determining, based at least in part on the header data of the audio signature data, the external call platform for the call; and determining, based at least in part on the meeting identifier data, the meeting identifier usable to initialize the call with the external call platform.

18. The non-transitory computer-readable storage medium of claim 15, wherein establishing the call connection for the call comprises initializing a real-time call connection via a network between the call device and the external call platform.

19. The non-transitory computer-readable storage medium of claim 18, wherein initializing the real-time call connection comprises initializing a real-time video call connection via the network between the call device and the external call platform.

20. The non-transitory computer-readable storage medium of claim 15, further comprising instructions, which when executed by the one or more processors of the call device, cause the call device to:

receive a call generation request;

determine meeting identifier data for the call generation request;

generate the audio signature data based at least in part on the meeting identifier data; and transmit the audio signature data to one or more client devices comprising at least the client device, wherein the audio signature data causes the one or more client devices to emit an audio signal upon activation of the audio signature data.

21. The non-transitory computer-readable storage medium of claim 15, wherein the audio signature data comprises user identifier data, and further comprising instructions, which when executed by the one or more processors of the call device, cause the call device to:

identify a user identifier as a participant in the call based at least in part on receipt of the user identifier data as a part of the audio signature data.

* * * * *